(12) United States Patent
Ohtake

(10) Patent No.: US 7,646,548 B2
(45) Date of Patent: Jan. 12, 2010

(54) ZOOM LENS AND IMAGE CAPTURING APPARATUS

(75) Inventor: Motoyuki Ohtake, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/666,357

(22) PCT Filed: Oct. 6, 2005

(86) PCT No.: PCT/JP2005/018548

§ 371 (c)(1),
(2), (4) Date: Jun. 9, 2008

(87) PCT Pub. No.: WO2006/048993

PCT Pub. Date: May 11, 2006

(65) Prior Publication Data

US 2009/0135485 A1 May 28, 2009

(30) Foreign Application Priority Data

Nov. 8, 2004 (JP) .............................. 2004-323645

(51) Int. Cl.
*G02B 15/14* (2006.01)
*G02B 27/64* (2006.01)

(52) U.S. Cl. .................. 359/689; 359/683; 359/684; 359/557

(58) Field of Classification Search .................. 359/676, 359/680–689, 557, 554, 694, 695; 396/72–88; 348/240.99–240.3; *G02B 027/64, 015/14, G02B 015/16*
See application file for complete search history.

(56) References Cited

U.S. PATENT DOCUMENTS

| 5,537,255 | A  | * | 7/1996  | Tochigi ....................... 359/684 |
| 6,473,231 | B2 | * | 10/2002 | Hamano et al. ............. 359/557 |
| 6,606,202 | B2 | * | 8/2003  | Hoshi .......................... 359/687 |

FOREIGN PATENT DOCUMENTS

| JP | 62-215225   | 9/1987 |
| JP | 07-151967   | 6/1995 |
| JP | 11-194270   | 7/1999 |
| JP | 2000-121938 | 4/2000 |
| JP | 2000-162500 | 6/2000 |
| JP | 2002-072086 A | 3/2002 |

(Continued)

OTHER PUBLICATIONS

Japanese Office Action dated Dec. 11, 2007 relating to corresponding Japanese Application No. 2004-323645.

(Continued)

*Primary Examiner*—Darryl J Collins
*Assistant Examiner*—Zachary Wilkes
(74) *Attorney, Agent, or Firm*—Rader, Fishman & Grauer PLLC

(57) ABSTRACT

A zoom lens in which a lens group located in the vicinity of an aperture stop includes two subgroups and one of the subgroups is shifted so that an image is shifted. An increase in the size of lens groups including a shift lens group can be prevented. In addition, the sensitivity with respect to the axis tilt can be reduced while maintaining a sufficient distance between the two subgroups without increasing the size of the lens groups.

15 Claims, 25 Drawing Sheets

FOREIGN PATENT DOCUMENTS

| | | |
|---|---|---|
| JP | 2002-244037 | 8/2002 |
| JP | 2003-228001 | 8/2003 |
| JP | 2003-295057 | 10/2003 |
| JP | 2005-345970 | 12/2005 |

OTHER PUBLICATIONS

Supplemental European Search Report and Opinion dated Jun. 6, 2008 for corresponding European Application No. 05 79 0613.

* cited by examiner

ZOOM LENS AND IMAGE CAPTURING APPARATUS

TECHNICAL FIELD

The present invention relates to a novel zoom lens and an image capturing apparatus. More particularly, the present invention relates to a zoom lens suitable for cameras, such as video cameras and digital still cameras, that receive light using an image sensing device and suitable for correcting blurring of an image due to shaking of the cameras and an image capturing apparatus including the zoom lens.

BACKGROUND ART

A method has been known in which a subject image is formed on an image sensing device using a photoelectric transducer, such as a charged coupled device (CCD) or a complementary metal-oxide semiconductor (CMOS) that serves as recording means of a camera, and the light intensity of the subject image is converted to an electrical output by the photoelectric transducer and is recorded.

In recent years, with the advancement of microfabrication techniques, central processing units (CPUs) have been increasing in processing speed and recording media have been increasing in memory density. Thus, a large volume of image data that could not be processed before can now be processed at a high speed. In addition, the density of light receiving elements has been increased with decreasing size of an image sensing element. The increased density of light receiving elements allows a camera to record an image of high spatial frequency. The decreased size of light receiving elements allows the size of the body of a camera to be decreased.

In addition, in order for users to use a camera in a wide range of an image capturing environment, the demand for a zoom lens is increasing and, in particular, the demand for a zoom lens with a high zoom ratio is increasing.

However, in an optical system having a high zoom ratio, the angle of field of view is decreased in a telephoto setting. Accordingly, even a slight hand vibration causes significant blurring of an image. Therefore, in video cameras having a high zoom ratio, electronic image stabilization systems have been developed in which an image receiving area of the light receiving element is shifted so that the image blurring caused by hand vibration is reduced.

In addition, image stabilization optical systems have been developed in which some of the lens groups of a lens system are shifted in a direction substantially perpendicular to the optical axis so that degradation of the optical performance caused by a shift in the image position is reduced.

These image stabilization optical systems include, for example, a detection subsystem for detecting image blurring caused by hand vibration occurring, for example, when a shutter is released, a control subsystem for providing an amount of correction for moving a lens position on the basis of a signal output from the detection subsystem, and a drive subsystem for moving a predetermined lens on the basis of the output from the control subsystem. Thus, these image stabilization optical systems can function as optical image stabilization systems.

These optical image stabilization systems can shift the image by the drive subsystem shifting the lens. Accordingly, the optical image stabilization systems can correct the image blurring due to shaking of the camera by shifting the lens using the drive subsystem.

For example, Japanese Unexamined Patent Application Publication Nos. 2002-244037, 2003-228001, and 2003-295057 describe such image stabilization optical systems.

A zoom lens described in Japanese Unexamined Patent Application Publication No. 2002-244037 includes a third lens group disposed on the image side of an aperture stop. The third lens group includes a negative subgroup and a positive subgroup. By moving the positive subgroup, the image is shifted.

A zoom lens described in Japanese Unexamined Patent Application Publication No. 2003-228001 includes a third lens group disposed on the image side of an aperture stop. The third lens group includes a positive subgroup and a negative subgroup. By moving the positive subgroup, the image is shifted.

A zoom lens described in Japanese Unexamined Patent Application Publication No. 2003-295057 includes a third lens group. By moving the entire third lens group, the image is shifted.

DISCLOSURE OF INVENTION

However, when, as described in Japanese Unexamined Patent Application Publication No. 2003-295057, the entire third lens group is shifted, variations in off-axis aberrations occurring when variable magnification is performed need to be sufficiently corrected and variations in off-axis aberrations occurring when the entire third lens group is shifted need to be sufficiently corrected. Therefore, the number of lenses of the third lens group is increased. Consequently, it is difficult to reduce the weight and the size of the zoom lens.

Additionally, in the case where, as described in Japanese Unexamined Patent Application Publication Nos. 2002-244037 and 2003-228001, a zoom lens includes a positive subgroup and a negative subgroup on the image side of an aperture stop, to reduce the refractive powers of the two subgroups, the distance between the two subgroups needs to be sufficiently increased. However, to sufficiently increase the distance between the two subgroups, the size of the zoom lens cannot be reduced. Thus, the distance between the two subgroups cannot be sufficiently increased. As a result, the refractive powers of the two subgroups cannot be reduced, and therefore, degradation of the performance increases due to the optical axis tilt between the two subgroups.

Accordingly, the present invention provides a zoom lens including a lens group disposed in the vicinity of an aperture stop and having two subgroups. By shifting one of the two subgroups so as to shift an image, the size of the lens group including a shift group can be reduced. In addition, by maintaining a sufficient distance between the two subgroups without increasing the size of the zoom lens, the sensitivity with respect to the optical axis tilt is reduced. Thus, a sufficient performance can be obtained.

According to the present invention, a zoom lens includes at least three lens groups including a negative lens group having a negative refractive power, a shift lens group, and a positive lens group having a positive refractive power arranged in this order from an object side. When the lens position is moved from a wide-angle setting to a telephoto setting, at least the negative lens group and the positive lens group move so that a distance between the negative lens group and the shift lens group is decreased and a distance between the shift lens group and the positive lens group is changed. The shift lens group includes at least two subgroups, an aperture stop is disposed between the two subgroups, and an image is capable of being shifted by shifting one of the subgroups in a direction substantially perpendicular to an optical axis. The following conditional expression (1) is satisfied:

$$Ds/ft>0.1 \quad (1)$$

where Ds denotes a distance along the optical axis extending from the lens surface that is the closest to the image among the lens surfaces of the subgroup located on the object side to the lens surface that is the closest to the object among the lens surfaces of the subgroup located on the image side, and ft denotes the focal length of the entire lens system in the telephoto setting.

According to the present invention, an image capturing apparatus includes a zoom lens and an image sensing device for converting an optical image formed by the zoom lens to an electrical signal. The zoom lens includes at least three lens groups including a negative lens group having a negative refractive power, a shift lens group, and a positive lens group having a positive refractive power arranged in this order from an object side. When the lens position is moved from a wide-angle setting to a telephoto setting, at least the negative lens group and the positive lens group move so that a distance between the negative lens group and the shift lens group is decreased and a distance between the shift lens group and the positive lens group is changed. The shift lens group includes at least two subgroups, an aperture stop is disposed between the two subgroups, and an image is capable of being shifted by shifting one of the subgroups in a direction substantially perpendicular to an optical axis. The following conditional expression (1) is satisfied:

$$Ds/ft>0.1 \quad (1)$$

where Ds denotes a distance along the optical axis extending from the lens surface that is the closest to the image among the lens surfaces of the subgroup located on the object side to the lens surface that is the closest to the object among the lens surfaces of the subgroup located on the image side, and ft denotes the focal length of the entire lens system in the telephoto setting.

As described above, according to the present invention, the two subgroups of the shift lens group are disposed with an aperture stop therebetween and with a sufficient spacing therebetween.

BRIEF DESCRIPTION OF THE DRAWINGS

FIG. 5 illustrates spherical aberration, astigmatism, distortion, and coma aberration in the wide-angle setting;

FIG. 6 illustrates spherical aberration, astigmatism, distortion, and coma aberration in the middle focal length setting;

FIG. 7 illustrates spherical aberration, astigmatism, distortion, and coma aberration in the telephoto setting;

FIG. 8 illustrates transverse aberration in the wide-angle setting;

FIG. 9 illustrates the transverse aberration in the middle focal length setting;

FIG. 10 illustrates the transverse aberration in the telephoto setting;

FIG. 12 illustrates spherical aberration, astigmatism, distortion, and coma aberration in the wide-angle setting;

FIG. 13 illustrates spherical aberration, astigmatism, distortion, and coma aberration in the middle focal length setting;

FIG. 14 illustrates spherical aberration, astigmatism, distortion, and coma aberration in the telephoto setting;

FIG. 15 illustrates transverse aberration in the wide-angle setting;

FIG. 16 illustrates the transverse aberration in the middle focal length setting;

FIG. 17 illustrates the transverse aberration in the telephoto setting;

FIG. 19 illustrates spherical aberration, astigmatism, distortion, and coma aberration in the wide-angle setting;

FIG. 20 illustrates spherical aberration, astigmatism, distortion, and coma aberration in the middle focal length setting;

FIG. 21 illustrates spherical aberration, astigmatism, distortion, and coma aberration in the telephoto setting;

FIG. 22 illustrates transverse aberration in the wide-angle setting;

FIG. 23 illustrates the transverse aberration in the middle focal length setting;

FIG. 24 illustrates the transverse aberration in the telephoto setting; and

BEST MODE FOR CARRYING OUT THE INVENTION

Figure 1:
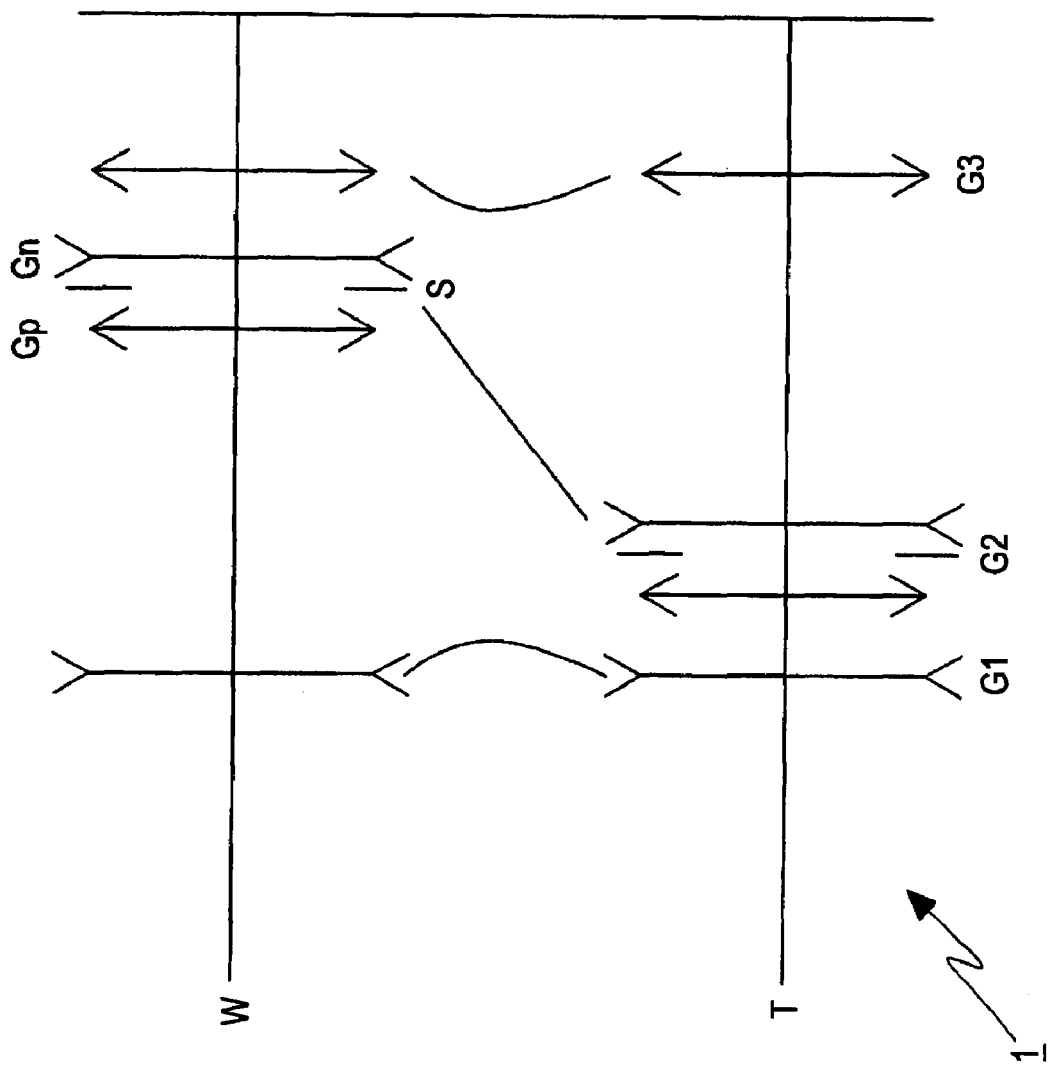
FIG. 1 illustrates a refractive power arrangement of a zoom lens and whether or not each of the lens groups of the zoom lens is movable when variable magnification is performed according to a first embodiment of the present invention.

Best mode embodiments of a zoom lens and an image capturing apparatus according to the present invention are described below with reference to the accompanying drawings.

A zoom lens according to the present invention is described first.

According to the present invention, a zoom lens includes at least three lens groups, that is, a negative lens group having a negative refractive power, a shift lens group, and a positive lens group having a positive refractive power arranged in this order from the object side. When the lens position is changed from a wide-angle setting to a telephoto setting, at least the negative lens group and the positive lens group are moved so that the distance between the negative lens group and the shift lens group is decreased and the distance between the shift lens group and the positive lens group is changed.

The shift lens group includes at least two subgroups. An aperture stop is disposed between the two subgroups. By shifting either one of the two subgroups (hereinafter referred to as a "shift subgroup") in a direction substantially perpendicular to the optical axis, an image can be shifted. In addition, the following conditional expression (1) is satisfied:

$$Ds/ft>0.1 \quad (1)$$

where

Ds denotes a distance along the optical axis extending from the lens surface that is the closest to the image among the lens surfaces of the subgroup located on the object side to the lens surface that is the closest to the object among the lens surfaces of the subgroup located on the image side, and ft denotes the focal length of the entire lens system in the telephoto setting.

According to the present invention, the position of the aperture stop is important for the zoom lens.

In existing technologies, an aperture stop is disposed on the object side of the third lens group. In contrast, in the zoom lens according to the present invention, an aperture stop is disposed between the two subgroups of the shift lens group so that the distance between the two subgroups can be increased. Thus, the refractive powers of the two subgroups of the shift lens group are reduced. By reducing the refractive power of each of the two subgroups, a change in the angle of field of view occurring when the shift subgroup is shifted is reduced.

In general, the aperture stop is essential. In existing technologies, in general, the aperture stop is disposed between the second lens group and the third lens group. Thus, a space is provided for disposing the aperture stop. Accordingly, the change in the position of the aperture stop does not increase the size of the optical system.

The mechanism for reducing the refractive power of each of the two subgroups by disposing the aperture stop between the two subgroups of the shift lens group is described with reference to a refractive power arrangement.

Let $\phi 3n$ denote the refractive power of a subgroup disposed on the object side of the aperture stop, $\phi 3p$ denote the refractive power of a subgroup disposed on the image side of the aperture stop, and d denote the distance between the principal points. Then, a refractive power $\phi 3$ of the shift lens group is given by the equation: $\phi 3 = \phi 3n + \phi 3p - \phi 3n \cdot \phi 3p \cdot d$.

If the subgroup on the object side has a negative refractive power and the subgroup on the image side has a positive refractive power, $\phi 3n < 0$ and $\phi 3p > 0$. Therefore, $(\phi 3n + \phi 3p)$ is canceled out. As a result, $\phi 3n \cdot \phi 3p \cdot d$ is important.

In the zoom lens according to the present invention, by disposing the aperture stop between the two subgroups of the shift lens group, the distance between the two subgroups is increased and the distance d between the principal points which appears in the above-described $\phi 3n \cdot \phi 3p \cdot d$ is increased. Thus, the two refractive powers $\phi 3n$ and $\phi 3p$ can be reduced.

According to the present invention, the zoom lens having such a structure can reduce degradation of an image occurring when either one of the two subgroups of the sift lens group (the shift subgroup) is shifted while maintaining the compact size. In addition, the sensitivity of an axis tilt between the two subgroups is reduced, and therefore, the zoom lens can be easily manufactured.

It is necessary that the zoom lens according to the present invention satisfies the following conditional expression (1):

$$Ds/ft>0.1 \quad (1)$$

where

Ds denotes a distance along the optical axis extending from the lens surface that is the closest to the image among the lens surfaces of the subgroup located on the object side to the lens surface that is the closest to the object among the lens surfaces of the subgroup located on the image side, and ft denotes the focal length of the zoom lens in the telephoto setting.

The above-described conditional expression (1) is used for determining the distance formed between the two subgroups of the shift lens group. If Ds/ft is less than or equal to the lower limit, the refractive power of the subgroup of the shift lens group on the image side is increased, and therefore, the change in the angle of field of view occurring when the subgroup on the image side is shifted is increased.

If the distance between the two subgroups of the shift lens group is increased too much, the size of the entire lens system is increased. Accordingly, it is desirable that the upper limit of conditional expression (1) is determined to be 0.3.

According to the present invention, to sufficiently correct the variation in coma aberration occurring at the peripheral portion of a screen when the shift subgroup is shifted, it is desirable that the zoom lens satisfies the following conditional expression (2):

$$D3p/f3p<0.35 \quad (2)$$

where

D3P denotes a distance between the aperture stop and the lens surface that is the closest to the image among the lens surfaces of the subgroup located on the image side, and f3P denotes the focal length of the subgroup located on the image side.

The above-described conditional expression (2) is used for sufficiently correcting coma aberration occurring on the lens surface that is the closest to the image among the lens surfaces of the subgroup located on the image side.

If D3p/fp is greater than or equal to the upper limit of conditional expression (2), the off-axis light beam is strongly refracted on the lens surface that is the closest to the image among the lens surfaces of the subgroup located on the image side, and therefore, the coma aberrations are not sufficiently corrected at the peripheral portion of a screen. In particular, when the subgroup located on the image side is shifted, the refraction of the off-axis light beam is significantly changed on that lens surface. Accordingly, it is difficult to sufficiently correct the degradation of the performance occurring at the time of shifting.

According to the present invention, to satisfy conditional expression (2) and sufficiently correct the variations of coma aberrations occurring when the subgroup located on the image side is shifted, it is desirable that the zoom lens satisfies the following conditional expression (3):

$$0.08<D3s/R3p<0.2 \quad (3)$$

where

D3s denotes a distance along the axis extending from the aperture stop to the lens surface that is the closest to the object among the lens surfaces of the subgroup located on the image side, and Rp denotes the radius of curvature of the lens surface that is the closest to the object among the lens surfaces of the subgroup located on the image side.

The above-described conditional expression (3) is used for determining the radius of curvature of the lens surface that is the closest to the object among the lens surfaces of the subgroup located on the image side and for sufficiently correcting the variation in curvature of field, that is, the variation in the coma-aberration correction state occurring when the subgroup located on the image side is shifted.

If D3s/R3p is greater than or equal to the upper limit of conditional expression (3), the slope of coma aberration changes when the subgroup located on the image side is shifted. Accordingly, the best position of the image plane at the peripheral portion of a screen is a position in which the image is out of focus with respect to the best position of the image plane at the center portion of a screen, and therefore, the image is out of focus. As a result, the out-of-focus occurs when the blurring caused by hand vibration is corrected and it is further difficult to sufficiently correct the optical performance.

If D3s/R3p is less than or equal to the lower limit of conditional expression (3), the lens surface on the object side among the lens surfaces of the subgroup located on the image side does not contribute to the correction of aberrations. Accordingly, when the subgroup located on the image side is shifted, an eccentric coma aberration occurring in the center portion of the screen is increased.

FIG. 1 is a schematic illustration of a refractive power arrangement diagram of a zoom lens 1 including three lens groups according to a first embodiment of the present invention.

The zoom lens 1 includes three lens groups: a first lens group G1 having a negative refractive power, a second lens group G2 having a positive refractive power, and a third lens group G3 having a positive refractive power disposed in this order from the object side. The second lens group G2 that serves as a shift lens group includes a positive subgroup Gp having a positive refractive power, an aperture stop S, and a negative subgroup Gn having a negative refractive power disposed in this order from the object side. When the focal length changes from the wide-angle setting in which the focal length is the shortest (a setting indicated by a reference symbol W in the upper section of FIG. 1) to the telephoto setting in which the focal length is the longest (a setting indicated by a reference symbol T in the lower section of FIG. 1), the second lens group is moved towards the object side, the third lens group is temporarily moved towards the object and, subsequently, is moved towards the image side, and the first lens group moves so as to compensate for variation in the position of the image plane caused by the movements of the second lens group and the third lens group.

Since the third lens group is temporarily moved towards the object, curvature of field occurring in the middle focus length setting is further sufficiently corrected.

Figure 2:
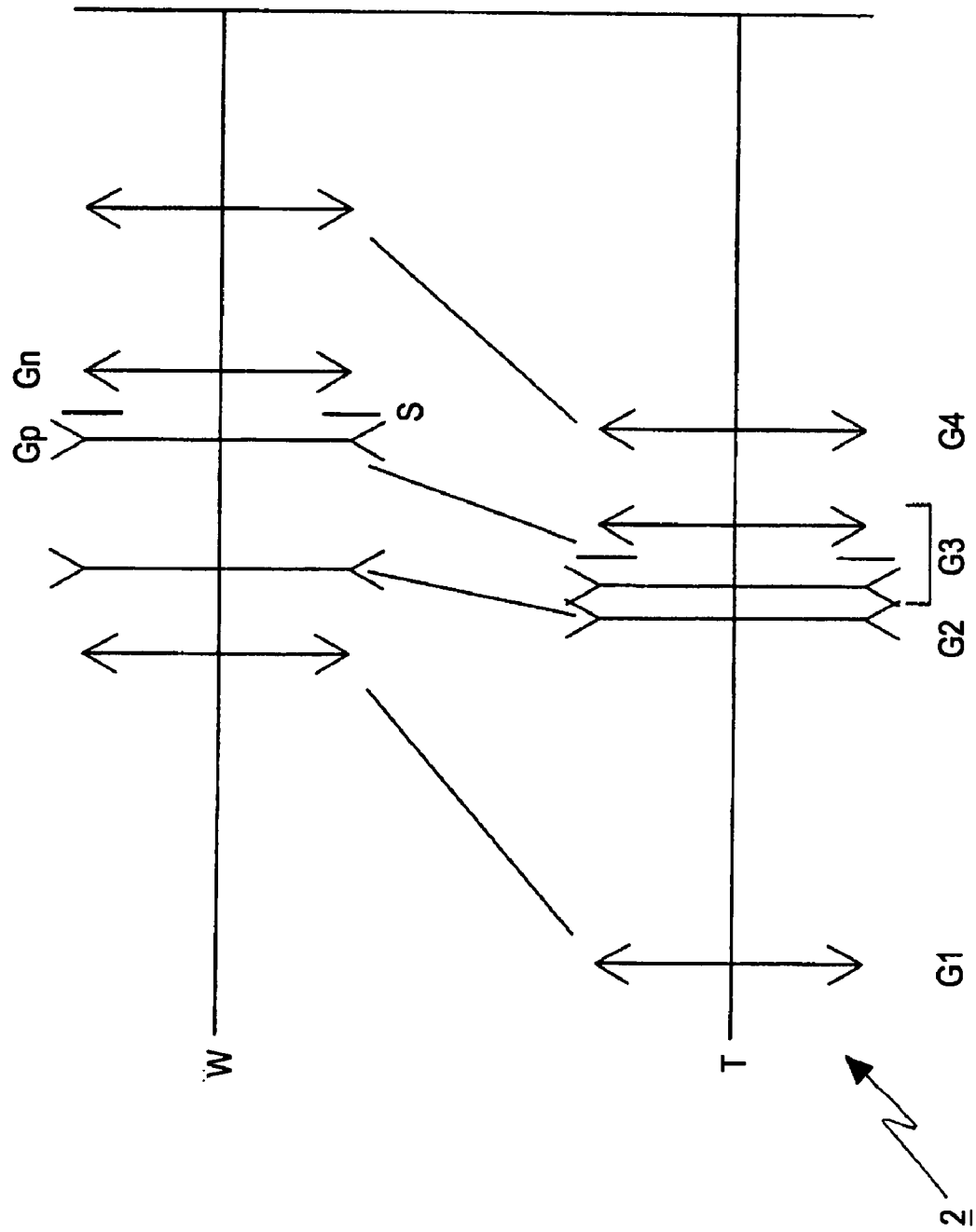
FIG. 2 illustrates a refractive power arrangement of a zoom lens and whether or not each of the lens groups of the zoom lens is movable when variable magnification is performed according to a second embodiment of the present invention.

FIG. 2 is a schematic illustration of a refractive power arrangement diagram of a zoom lens 2 including four lens groups according to a second embodiment of the present invention.

The zoom lens 2 includes four lens groups: a first lens group G1 having a positive refractive power, a second lens group G2 having a negative refractive power, a third lens group G3 having a positive refractive power, and a fourth lens group G4 having a positive refractive power disposed in this order from the object side. The third lens group G3 that serves as a shift lens group includes a negative subgroup Gn having a negative refractive power, an aperture stop S, and a positive subgroup Gp having a positive refractive power disposed in this order from the object side.

When the focal length changes from the wide-angle setting in which the focal length is the shortest (a setting indicated by a reference symbol W in the upper section of FIG. 2) to the telephoto setting in which the focal length is the longest (a setting indicated by a reference symbol T in the lower section of FIG. 2), the lens groups are moved towards the object so that the distance between the first lens group G1 and the second lens group G2 is increased, and the distance between the second lens group G2 and the third lens group G3 is decreased, and the distance between the third lens group G3 and the fourth lens group G4 is increased.

Figure 3:
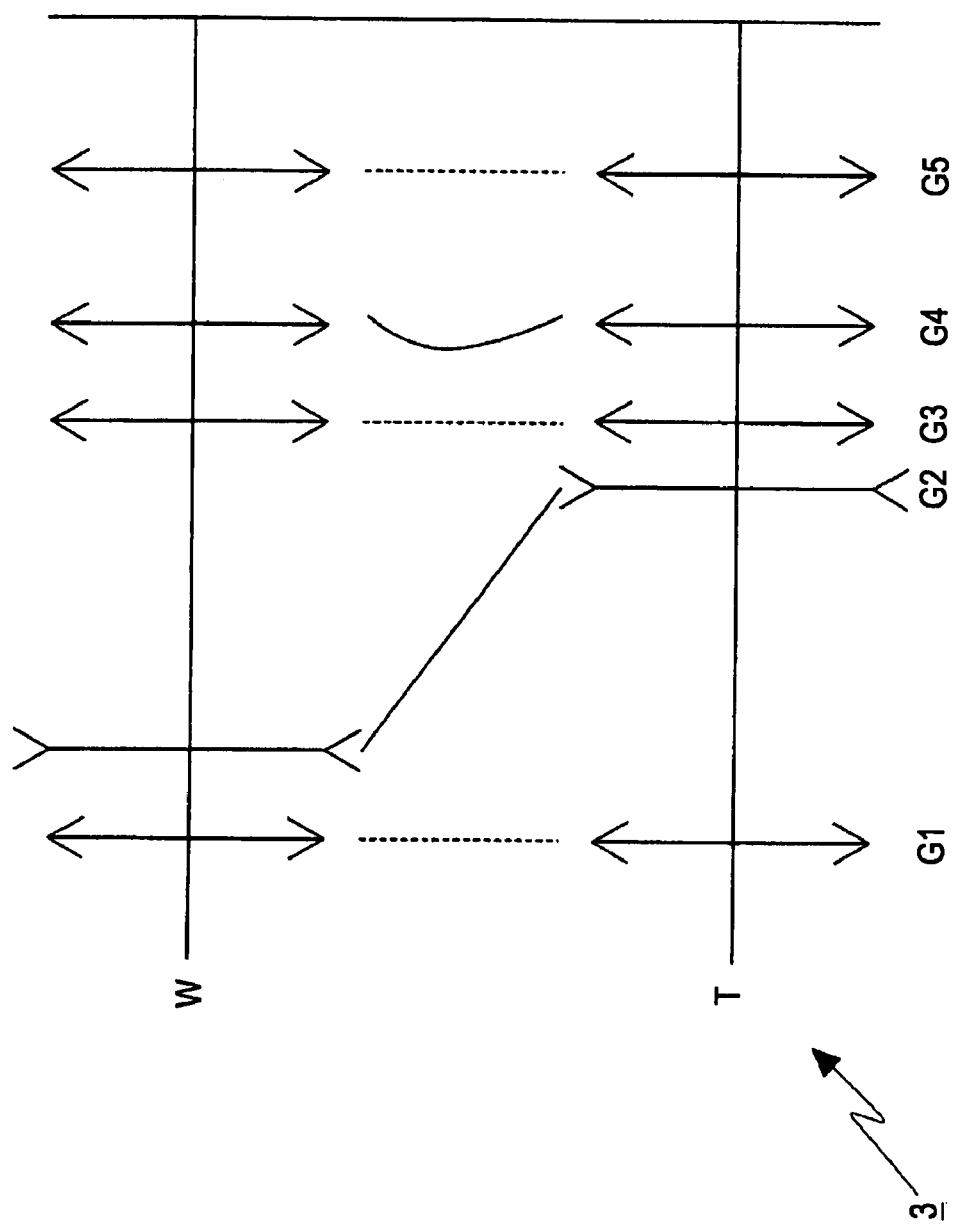
FIG. 3 illustrates a refractive power arrangement of a zoom lens and whether or not each of the lens groups of the zoom lens is movable when variable magnification is performed according to a third embodiment of the present invention.

FIG. 3 is a schematic illustration of a refractive power arrangement diagram of a zoom lens 3 including five lens groups according to a third embodiment of the present invention.

The zoom lens 3 includes five lens groups: a first lens group G1 having a positive refractive power, a second lens group G2 having a negative refractive power, a third lens group G3 having a positive refractive power, a fourth lens group G4 having a positive refractive power, and a fifth lens group G5 having a positive refractive power arranged in this order from the object side. When the lens position setting changes from the wide-angle setting (a setting indicated by a reference symbol W in the upper section of FIG. 3) to the telephoto setting (a setting indicated by a reference symbol T in the lower section of FIG. 3), the first lens group G1 remains stationary along the optical axis, the second lens group G2 is moved towards the image side, and the third lens group G3 remains stationary along the optical axis. In addition, the fourth lens group G4 compensates for the variation in the position of the image plane caused by the movement of the second lens group G2 and is moved along the optical axis for carrying out short-distance focusing, and the fifth lens group remains stationary along the optical axis.

Furthermore, the third lens group G3 serves as a shift lens group. The third lens group G3 includes an aperture stop S, a negative subgroup having a negative refractive power disposed on the object side of the aperture stop S, and a positive subgroup having a positive refractive power disposed on the image side of the aperture stop S. By moving the positive subgroup in a direction substantially perpendicular to the optical axis, the image can be shifted.

In the zoom lens 3, it is desirable that the positive subgroup disposed in the third lens group G3 includes a biconvex lens and a negative meniscus lens having a concave surface on the object side.

Such a structure can sufficiently correct spherical aberration. In addition, since the lens surface that is the closest to the image is a concave surface that is directed towards the aperture stop, a variation in coma aberration occurring when the positive subgroup is shifted can be sufficiently reduced.

In the zoom lens 3, to realize compactness and high performance at the same time and realize further compactness and high performance, it is desirable that the following conditional expression (4) is satisfied:

$$1 < f5/ft < 1.7 \tag{4}$$

where f5 denotes the focal length of the fifth lens group.

The above-described conditional expression (4) is used for determining the focal length of the fifth lens group.

If f5/ft is greater than or equal to the upper limit of conditional expression (4), the refractive power of the fourth lens group G4 is increased. Accordingly, when short-distance focusing is carried out and the fourth lens group G4 is moved at the time of zooming, variation in off-axis aberration is increased. To reduce the variation in off-axis aberration, the number of lenses included in the fourth lens group G4 needs to be increased. Thus, the amount of work required for driving the fourth lens group G4 is increased, and therefore, a driving system is complicated. As a result, the size of the zoom lens 3 cannot be sufficiently reduced.

In contrast, if f5/ft is less than or equal to the lower limit of conditional expression (4), out-of-axis rays that pass through the fifth lens group G5 are extremely far from the optical axis, and therefore, it is difficult to obtain a high optical performance by sufficiently correcting coma aberrations occurring in the peripheral portion of the screen.

In the zoom lens 3, to further reduce the total length thereof and increase the performance at the same time, it is desirable that the following conditional expression (5) is satisfied:

$$0.6 < f4/ft < 0.9 \quad (5)$$

where f4 denotes the focal length of the fourth lens group.

The above-described conditional expression (5) is used for determining the focal length of the fourth lens group G4.

If f4/ft is greater than or equal to the upper limit of conditional expression (5), an amount of movement of the fourth lens group G4 required for compensating for the variation in the position of the image plane caused by the movements of the second lens group G2 and a change in the position of the object is increased. Accordingly, the distance between the third lens group G3 and the fifth lens group G5 needs to be increased. Thus, the total length of the zoom lens 3 cannot be further reduced.

In contrast, if f4/ft is less than or equal to the lower limit of conditional expression (5), it is difficult to sufficiently reduce a negative spherical aberration independently occurring in the fourth lens group G4. Accordingly, the performance cannot be further increased.

Since known zoom lenses having a long back focus include four lens groups, the fourth lens group, in general, includes three lenses. An auto focus technology is presently being used and a high speed of an auto focus operation is required. Since a large number of lenses are used, the weight and the amount of movement of the lenses need to be reduced.

However, to reduce the weight, reduction of the focal length is required, resulting in an increase in an amount of movement of the lens. Thus, it is difficult to reduce the weight and the amount of movement of the lenses at the same time.

In the above-described zoom lens 3, the fifth lens group G5 is included. Thus, the number of lenses in the fourth lens group G4 can be decreased, so that the weight of the fourth lens group G4 can be reduced. Consequently, the weight and the amount of movement can be reduced at the same time.

In addition, by using a 3-CCD method, that is, by disposing a color separation prism that separates a light beam into R, G, and B colors on the image side of the above-described zoom lens 1, 2, or 3 and capturing each of the colors by means of a dedicated CCD, the above-described zoom lens 1, 2, or 3 can be suitably used.

Furthermore, according to the present invention, by using an aspherical lens, the optical performance can be further increased. In particular, by introducing an aspherical surface to the fifth lens group G5 of the zoom lens 3, the performance in the center portion can be further increased. In addition, by using an aspherical lens in the second lens group G2, the variation in coma aberration occurring at an angle of field of view in the wide-angle setting can be sufficiently corrected.

Still furthermore, by using a plurality of aspherical surfaces in one optical system, the optical performance can be further increased.

Additionally, to prevent an occurrence of moiré fringes on the image side of the lens system, a lowpass filter may be disposed. In addition, an infrared cut filter may be disposed in accordance with a spectral sensitivity characteristic of a light receiving element.

Using the third embodiment, several examples and numerical examples in which specific values are applied to these examples are described below.

In these examples, an aspherical surface is used. The shape of the aspherical surface is expressed by the following expression.

$$x = cy^2/(1+(1-(1+\kappa)c^2y^2)^{1/2}) + C_4 y^4 + C_6 y^6 + \ldots$$

where
 y denotes the height from the optical axis,
 x denotes the sag of the surface,
 c denotes the radius of curvature,
 κ denotes the conic constant, and
 C4, C6, ... denote aspherical coefficients.

Figure 4:
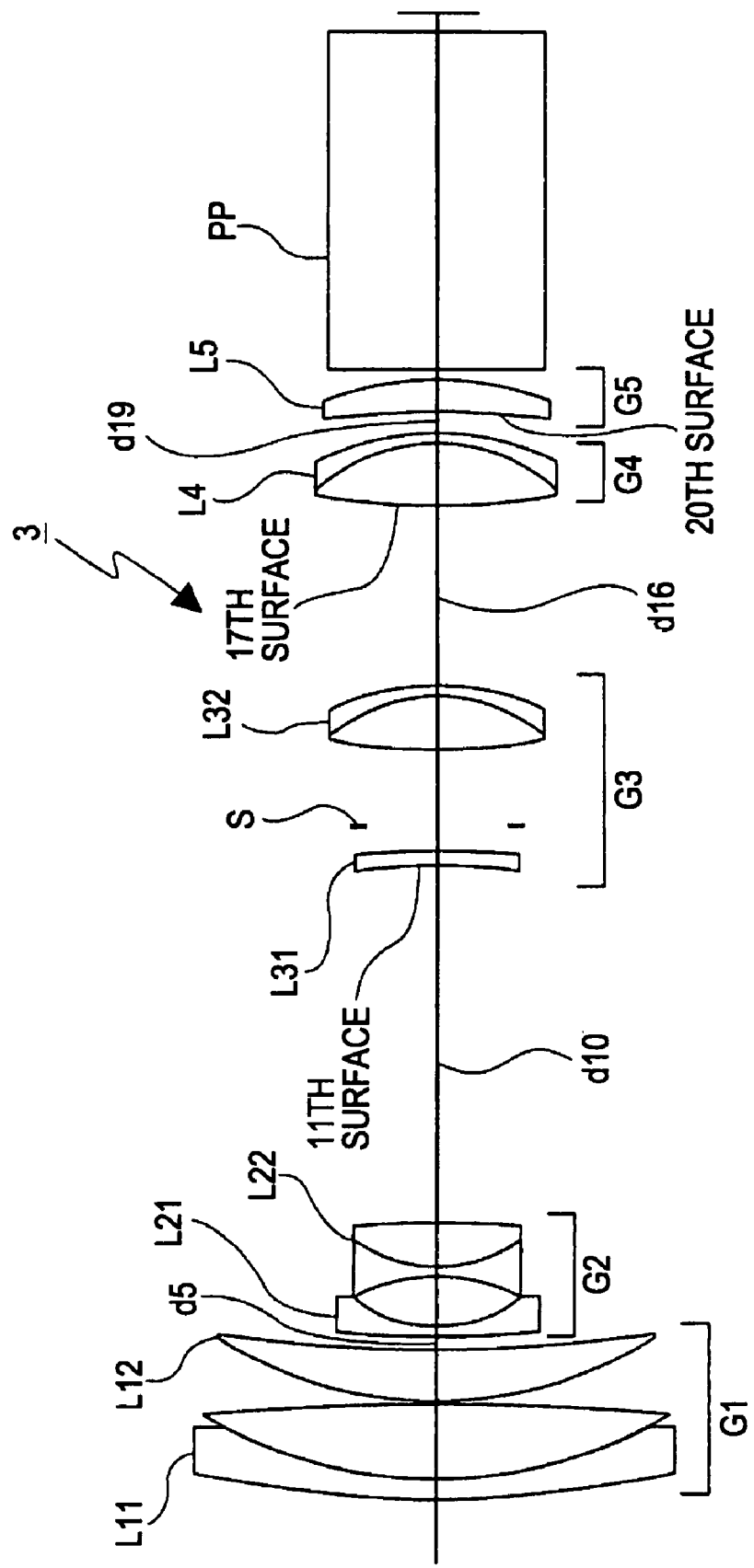
FIG. 4 illustrates a first example of a detailed lens structure of the zoom lens according to the third embodiment.

FIG. 4 illustrates a lens structure of the zoom lens 3 according to a first example. The first lens group G1 includes a cemented lens L11 composed of a negative meniscus lens having a convex surface on the object side and a positive lens having a convex surface on the object side and a positive lens L12 having a convex surface on the object side. The second lens group G2 includes a negative lens L21 having a concave surface on the image side and a cemented lens L22 composed of a negative biconcave lens and a positive lens having a convex surface on the object side. The third lens group G3 includes a negative meniscus lens (a negative subgroup) L31 having a concave surface on the object side and a positive cemented lens (a positive subgroup) L32 composed of a biconvex lens and a negative meniscus lens. The fourth lens group G4 includes a cemented lens L4 composed of a biconvex lens and a negative meniscus lens. The fifth lens group G5 includes a positive lens L5 having a concave surface on the image side.

In this first example, the aperture stop S is located between the negative subgroup L31 and the positive subgroup L32 of the third lens group G3, which is a shift lens group. The aperture stop S remains stationary regardless of a change in a lens position setting. In addition, by shifting the positive cemented lens L32 that serves as the positive subgroup in a direction perpendicular to the optical axis, an image can be shifted.

Furthermore, a color separation prism PP is disposed on the image side of the fifth lens group G5.

Table 1 is a specification sheet of a first numerical example in which specific values are applied to the first example. In specification sheets of the following numerical examples including the first numerical example, a symbol "f" denotes the focal length, a symbol "FNo" denotes the F number, and a symbol "2ω" denotes the angle of field of view. The index of refraction and the Abbe number are those for the d-line (λ=587.6 nm). In addition, the term "surface of a radius of curvature of 0" in Table 1 refers to a flat surface.

TABLE 1

| f 2.81~7.31~25.54 |
| FN0 1.85~2.18~2.47 |
| 2ω 60.06~22.83~6.59° |

| Surface number | Radius of curvature | Surface-surface distance | Index of refraction | Abbe number |
|---|---|---|---|---|
| 1: | 48.3220 | 0.700 | 1.84666 | 23.8 |
| 2: | 18.6766 | 3.080 | 1.62041 | 60.3 |
| 3: | −113.4087 | 0.200 | | |
| 4: | 17.1592 | 2.110 | 1.77250 | 49.6 |
| 5: | 60.8291 | (D5) | | |
| 6: | 60.8291 | 0.400 | 1.88300 | 40.8 |

TABLE 1-continued f 2.81~7.31~25.54
FNO 1.85~2.18~2.47
2ω 60.06~22.83~6.59°

| Surface number | Radius of curvature | Surface-surface distance | Index of refraction | Abbe number | |
|---|---|---|---|---|---|
| 7: | 5.5185 | 2.040 | | | |
| 8: | −7.3400 | 0.400 | 1.83500 | 43.0 | |
| 9: | 5.9722 | 1.880 | 1.92286 | 20.9 | |
| 10: | −33.2658 | (D10) | | | |
| 11: | −26.7336 | 0.600 | 1.77250 | 49.6 | |
| 12: | −33.7334 | 1.000 | | | |
| 13: | 0.0000 | 3.120 | | | (Aperture Stop) |
| 14: | 24.6742 | 2.200 | 1.51680 | 64.2 | |
| 15: | −7.0293 | 0.400 | 1.88300 | 40.8 | |
| 16: | −11.4340 | (D16) | | | |
| 17: | 26.1724 | 2.500 | 1.48749 | 70.4 | |
| 18: | −7.8043 | 0.400 | 1.84666 | 23.8 | |
| 19: | −11.0764 | (D19) | | | |
| 20: | −50.0000 | 1.240 | 1.58913 | 61.3 | |
| 21: | −13.4192 | 0.400 | | | |
| 22: | 0.0000 | 13.880 | 1.51680 | 64.2 | (Prism) |
| 23: | 0.0000 | (Bf) | | | |

The 11th, 17th, 20th lens surfaces are aspherical. The aspherical coefficients of these lens surfaces are shown in Table 2. In Table 2 and the following tables including the aspherical coefficients, the symbol "E-i" represents a decimal exponent, i.e., "$10^{-i}$". For example, "0.26029E−05" represents "$0.26029 \times 10^{-5}$".

TABLE 2

| 11th Surface | | |
|---|---|---|
| κ = +0.0000 | $C_4$ = −0.62660E−04 | $C_6$ = −0.11551E−04 |
| | $C_8$ = +0.10273E−05 | $C_{10}$ = −0.24031E−07 |
| 17th Surface | | |
| κ = +0.0000 | $C_4$ = −0.78487E−04 | $C_6$ = +0.20920E−05 |
| | $C_8$ = −0.95471E−07 | $C_{10}$ = +0.20499E−08 |
| 20th Surface | | |
| κ = +0.0000 | $C_4$ = −0.21209E−03 | $C_6$ = −0.34048E−06 |
| | $C_8$ = +0.43077E−07 | $C_{10}$ = −0.12019E−08 |

When the lens position setting is changed from the wide-angle setting to the telephoto setting, a surface-surface distance d5 between the first lens group G1 and the second lens group G2, a surface-surface distance d10 between the second lens group G2 and the third lens group G3, a surface-surface distance d16 between the third lens group G3 and the fourth lens group G4, and a surface-surface distance d19 between the fourth lens group G4 and the fifth lens group G5 are changed. Table 3 shows values of these surface-surface distances and focal lengths f in the wide-angle setting, the middle focal length setting which is between the wide-angle position and the telephoto position, and the telephoto setting.

TABLE 3

| f | 2.812 | 7.314 | 25.539 |
|---|---|---|---|
| D5 | 0.500 | 7.645 | 13.556 |
| D10 | 14.712 | 7.567 | 1.656 |
| D16 | 7.418 | 3.944 | 3.666 |
| D19 | 1.000 | 4.474 | 4.752 |
| Bf | 0.802 | 0.802 | 0.802 |

Table 4 shows values corresponding to the above-described conditional expressions (1), (2), (3), (4), and (5) according to the first numerical example.

TABLE 4 f3p = 21.836
f4 = 20.610
f5 = 30.748

(1) Ds/ft = 0.161
(2) D3p/f3p = 0.262
(3) D3s/R3p = 0.126
(4) f5/ft = 1.204
(5) f4/ft = 0.807

Figure 5:
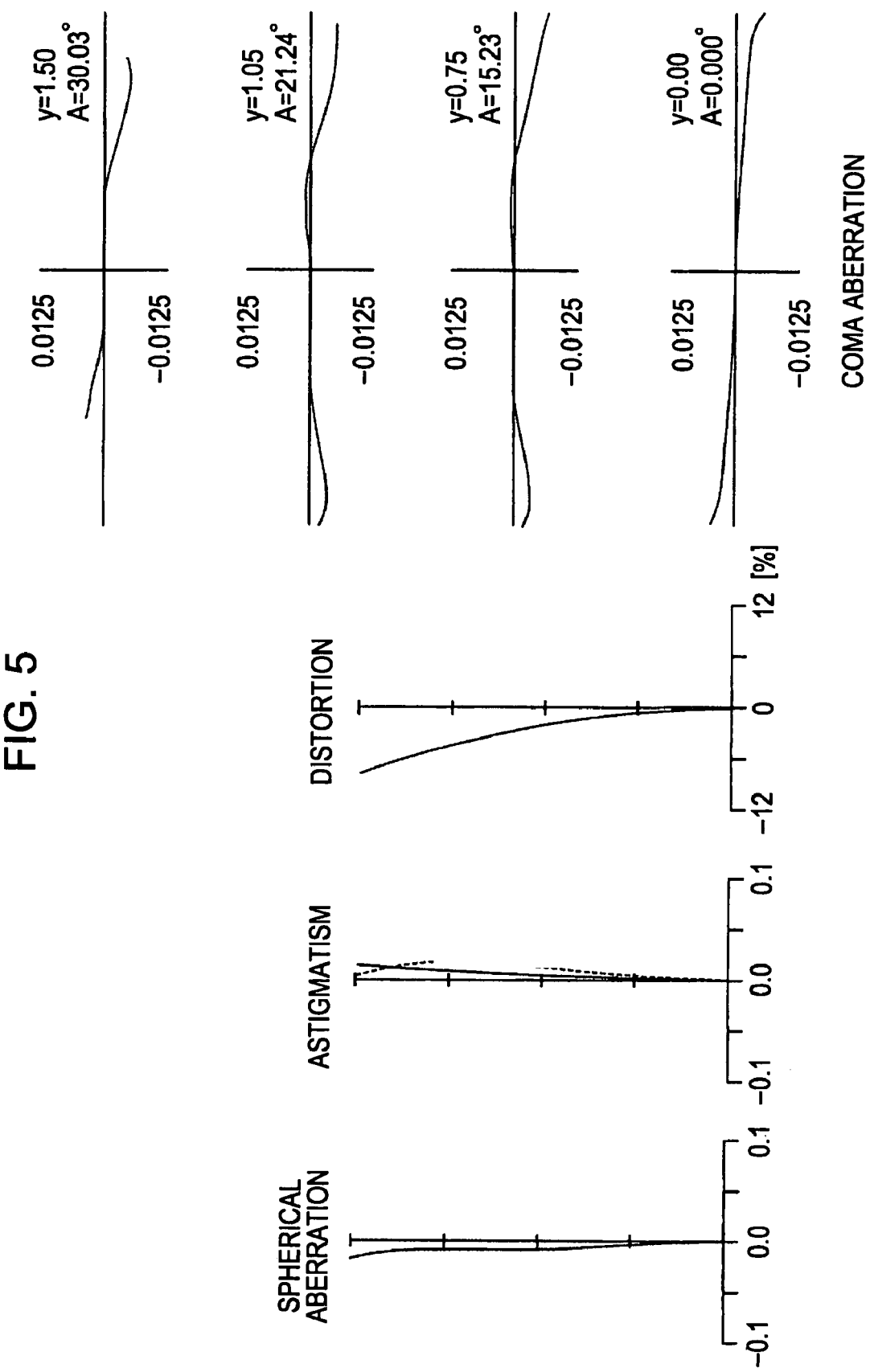
FIGS. 5 to 10 illustrate a variety of aberration graphs of a first numerical example in which specific values are applied to the first example, where
Figure 6:
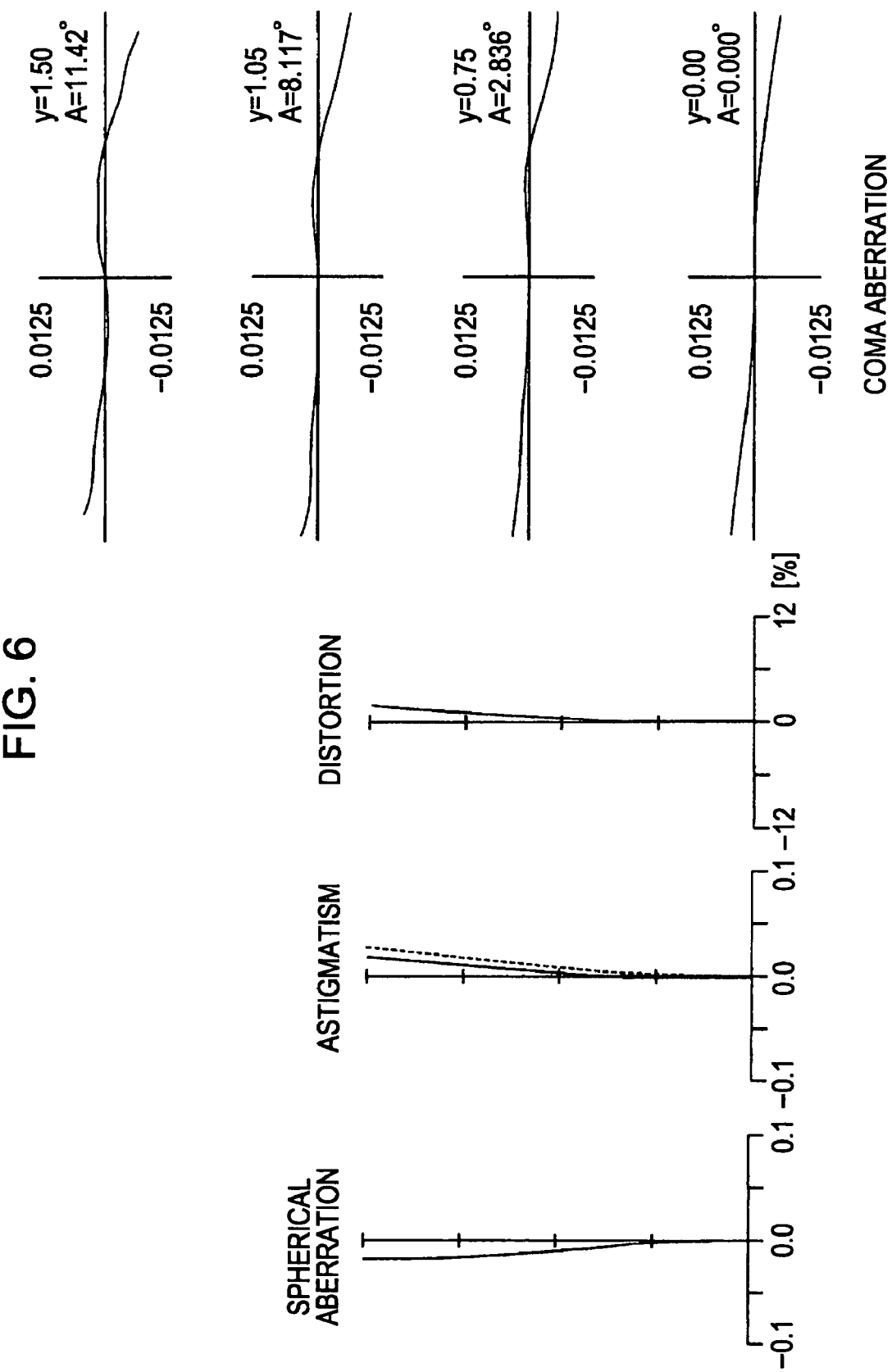
Figure 7:
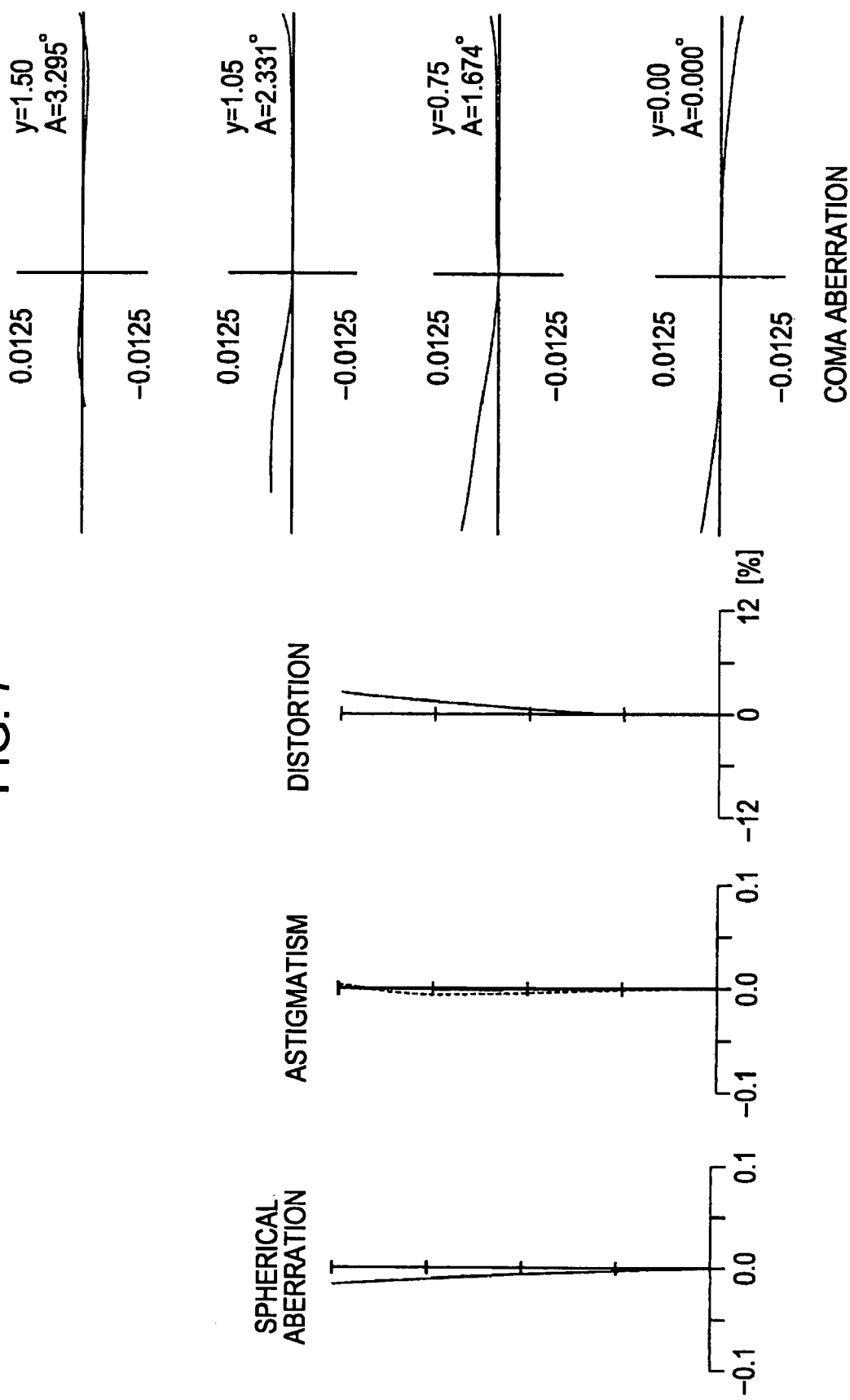

FIGS. 5 to 7 illustrate aberration graphs when the zoom lens focuses on infinity according to the first numerical example, where FIG. 5 illustrates aberration graphs in the wide-angle setting (f=2.812), FIG. 6 illustrates aberration graphs at the middle focal length setting (f=7.314), and FIG. 7 illustrates aberration graphs in the telephoto setting (f=25.539).

In the astigmatism graphs among the aberration graphs shown in FIGS. 5 to 7, a solid line indicates the sagittal image plane whereas a dotted line indicates the meridional image plane. In the coma aberration graphs, a symbol "y" indicates the image height, and a symbol "A" indicates the angle of field of view.

Figure 8:
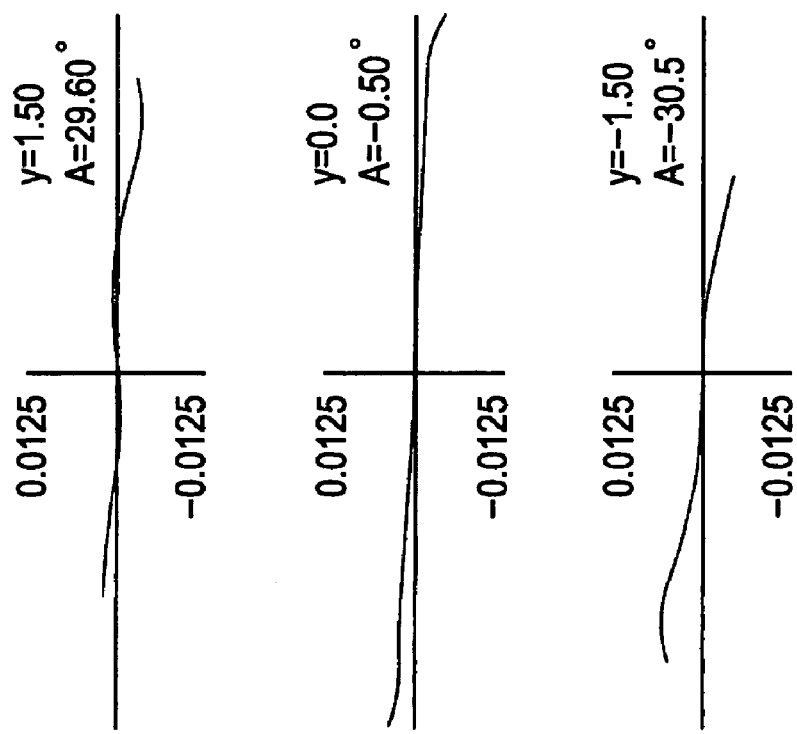
Figure 9:
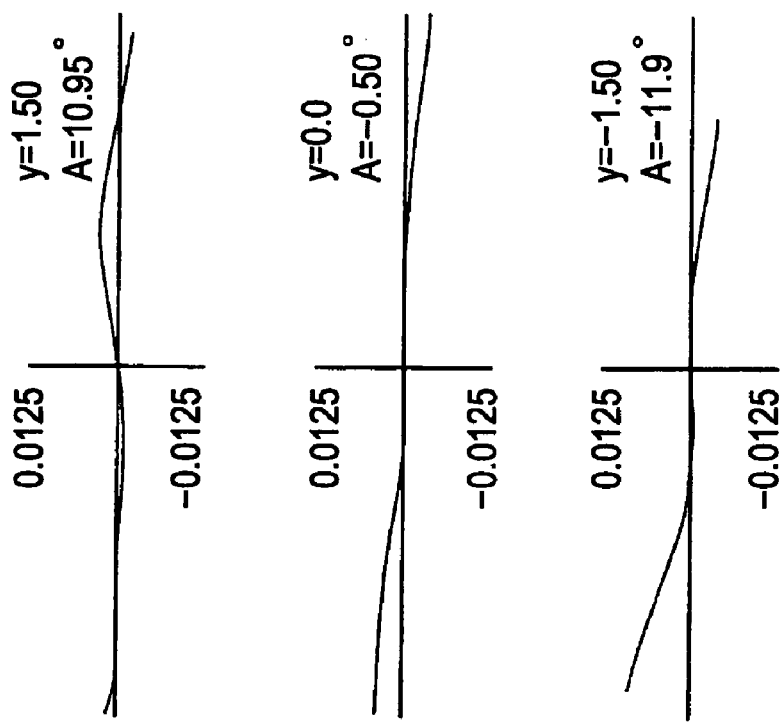
Figure 10:
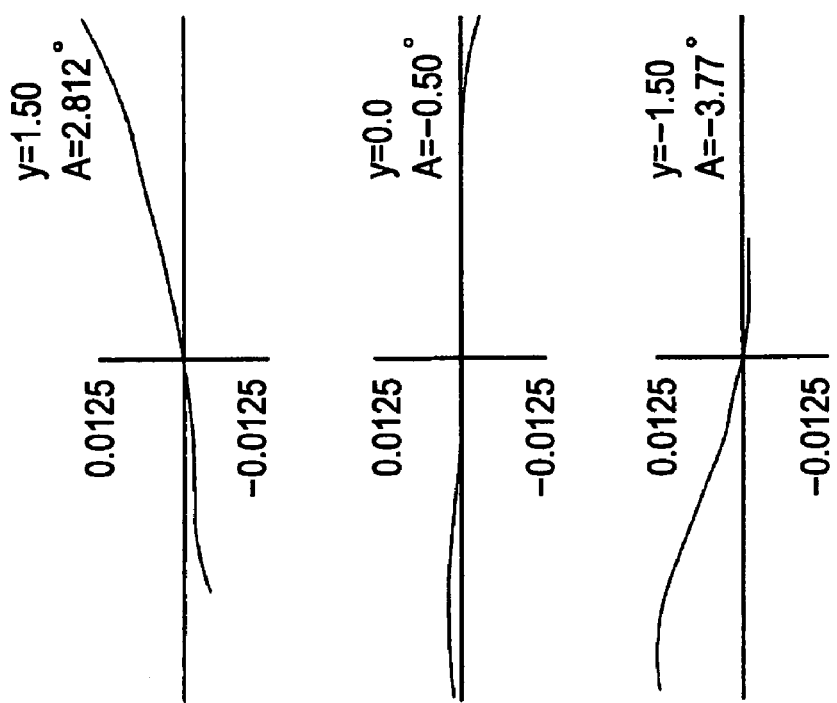

FIGS. 8 to 10 are transverse aberration graphs when the lens system focuses on infinity and is in a lens shift state corresponding to about 0.5 degrees according to the first numerical example, where FIG. 8 illustrates transverse aberration graphs in the wide-angle setting (f=2.812), FIG. 9 illustrates transverse aberration graphs in the middle focal length setting (f=7.314), and FIG. 8 illustrates transverse aberration graphs in the telephoto setting (f=25.539).

As can be seen from these aberration graphs, according to the first numerical example, various aberrations can be sufficiently corrected, and the zoom lens has an excellent image-forming performance.

Figure 11:
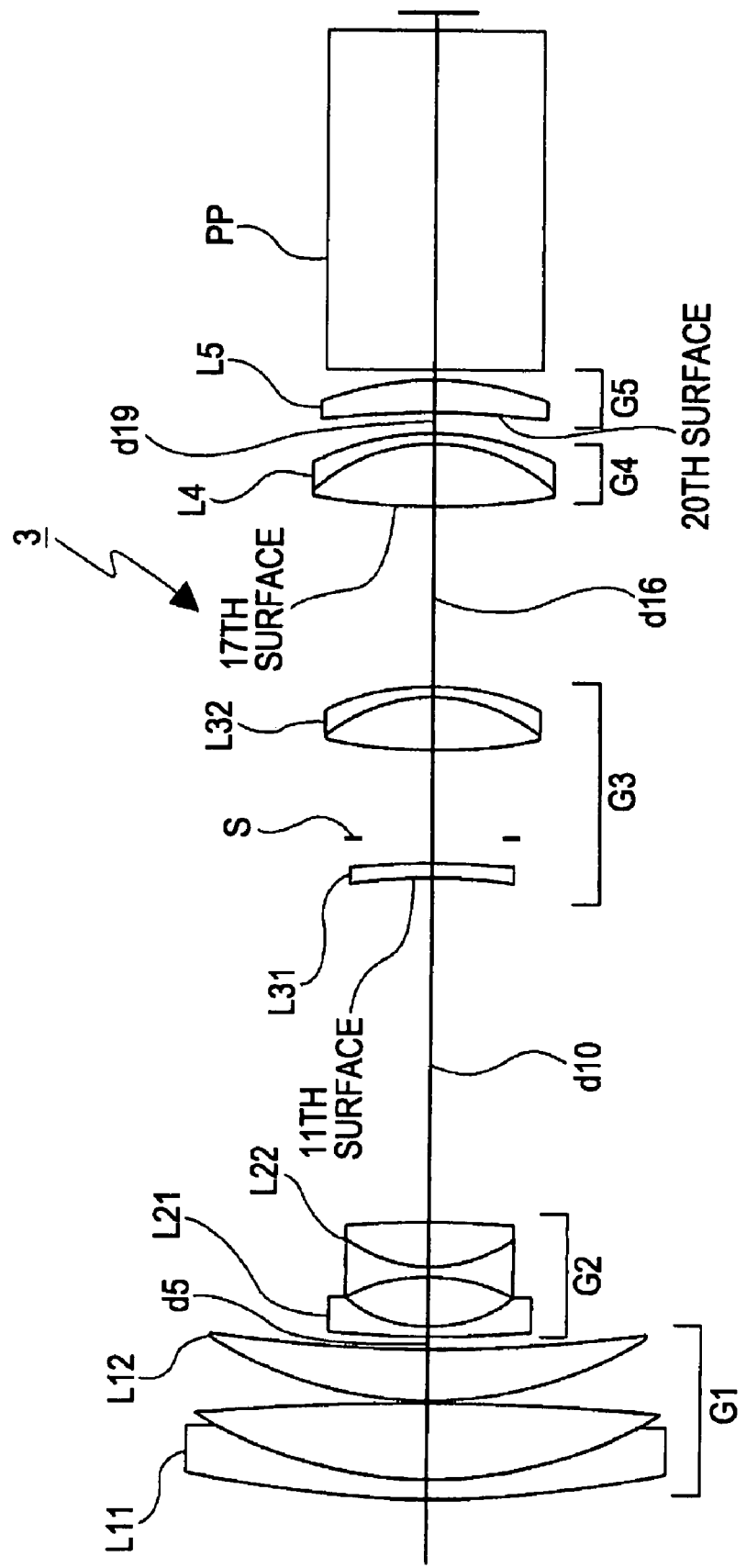
FIG. 11 illustrates a second example of a detailed lens structure of the zoom lens according to the third embodiment.

FIG. 11 illustrates a lens structure of the zoom lens 3 according to a second example. The first lens group G1 includes a cemented lens L11 composed of a negative meniscus lens having a convex surface on the object side and a positive lens having a convex surface on the object side and a positive lens L12 having a convex surface on the object side. The second lens group G2 includes a negative lens L21 having a concave surface on the image side and a cemented lens L22 composed of a negative biconcave lens and a positive lens having a convex surface on the object side. The third lens group G3 includes a negative meniscus lens L31 having a concave surface on the object side and a positive cemented lens L32 composed of a biconvex lens and a negative meniscus lens. The fourth lens group G4 includes a positive cemented lens L4 composed of a biconvex lens and a negative meniscus lens. The fifth lens group G5 includes a positive lens L5 having a convex surface on the image side.

In this second example, the aperture stop S is located between the negative subgroup L31 and the positive subgroup L32 of the third lens group G3, which is a shift lens group. The aperture stop S remains stationary regardless of a change in a lens position setting. In addition, by shifting the positive cemented lens L32 that serves as the positive subgroup in a direction perpendicular to the optical axis, an image can be shifted.

Furthermore, a color separation prism PP is disposed on the image side of the fifth lens group G5.

Table 5 is a specification sheet of a second numerical example in which specific values are applied to the second example.

TABLE 5 f 2.81~7.31~25.84
FN0 1.76~2.11~2.48
2ω 60.04~22.81~6.51°

| Surface number | Radius of curvature | Surface-surface distance | Index of refraction | Abbe number | |
|---|---|---|---|---|---|
| 1: | 38.3973 | 0.700 | 1.84666 | 23.8 | |
| 2: | 18.1212 | 3.060 | 1.60300 | 65.5 | |
| 3: | −152.9985 | 0.200 | | | |
| 4: | 17.1830 | 2.090 | 1.75500 | 52.3 | |
| 5: | 61.4210 | (D5) | | | |
| 6: | 60.5802 | 0.400 | 1.88300 | 40.8 | |
| 7: | 5.4893 | 2.000 | | | |
| 8: | −7.2609 | 0.400 | 1.83500 | 43.0 | |
| 9: | 5.8376 | 1.830 | 1.92286 | 20.9 | |
| 10: | −41.6015 | (D10) | | | |
| 11: | −46.0129 | 0.600 | 1.77250 | 49.6 | |
| 12: | −54.1124 | 1.000 | | | |
| 13: | 0.0000 | 3.600 | | | (Aperture Stop) |
| 14: | 22.4317 | 2.260 | 1.51680 | 64.2 | |
| 15: | −7.1997 | 0.400 | 1.88300 | 40.8 | |
| 16: | −12.0271 | (D16) | | | |
| 17: | 38.3138 | 2.240 | 1.60300 | 65.5 | |
| 18: | −8.9575 | 0.400 | 1.84666 | 23.8 | |
| 19: | −14.0066 | (D19) | | | |
| 20: | −50.0000 | 1.240 | 1.58913 | 61.3 | |
| 21: | −13.6205 | 0.400 | | | |
| 22: | 0.0000 | 13.880 | 1.51680 | 64.2 | (Prism) |
| 23: | 0.0000 | (Bf) | | | |

The 11th, 17th, 20th lens surfaces are aspherical. The aspherical coefficients of these lens surfaces are shown in Table 6.

TABLE 6

| 11th Surface | | |
|---|---|---|
| κ = +0.0000 | $C_4$ = −0.52747E−04 | $C_6$ = −0.12407E−04 |
| | $C_8$ = +0.12032E−05 | $C_{10}$ = −0.31716E−07 |
| 17th Surface | | |
| κ = +0.0000 | $C_4$ = −0.69601E−04 | $C_6$ = +0.16009E−05 |
| | $C_8$ = −0.67896E−07 | $C_{10}$ = +0.12194E−08 |
| 20th Surface | | |
| κ = +0.0000 | $C_4$ = −0.19629E−03 | $C_6$ = −0.11175E−05 |
| | $C_8$ = +0.69309E−07 | $C_{10}$ = −0.14446E−08 |

When the lens position setting is changed from the wide-angle setting to the telephoto setting, a surface-surface distance d5 between the first lens group G1 and the second lens group G2, a surface-surface distance d10 between the second lens group G2 and the third lens group G3, a surface-surface distance d16 between the third lens group G3 and the fourth lens group G4, and a surface-surface distance d19 between the fourth lens group G4 and the fifth lens group G5 are changed. Table 7 shows values of these surface-surface distances and focal lengths f in the wide-angle setting, the middle focal length setting which is between the wide-angle position and the telephoto position, and the telephoto setting.

TABLE 7

| f | 2.812 | 7.314 | 25.845 |
|---|---|---|---|
| D5 | 0.500 | 7.465 | 13.200 |
| D10 | 14.300 | 7.335 | 1.600 |

TABLE 7-continued

| D16 | 7.680 | 4.087 | 3.610 |
|---|---|---|---|
| D19 | 1.000 | 4.593 | 5.070 |
| Bf | 0.802 | 0.802 | 0.802 |

Table 8 shows values corresponding to the above-described conditional expressions (1), (2), (3), (4), and (5) according to the second numerical example.

TABLE 8 f3p = 22.112
f4 = 20.663
f5 = 31.379

(1) Ds/ft = 0.178
(2) D3p/f3p = 0.283
(3) D3s/R3p = 0.160
(4) f5/ft = 1.214
(5) f4/ft = 0.800

Figure 12:
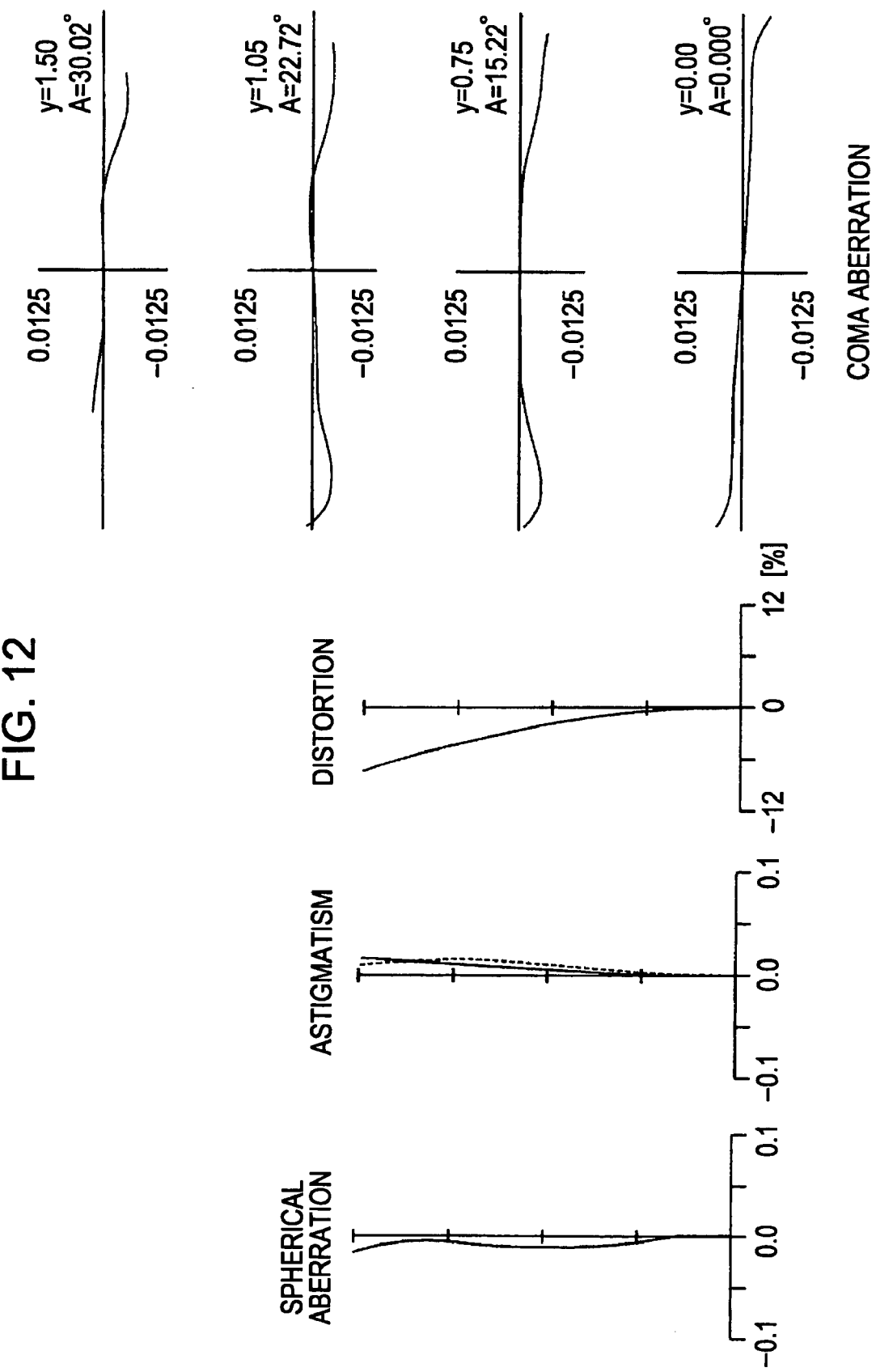
FIGS. 12 to 17 illustrate a variety of aberration graphs of a second numerical example in which specific values are applied to the second example, where
Figure 13:
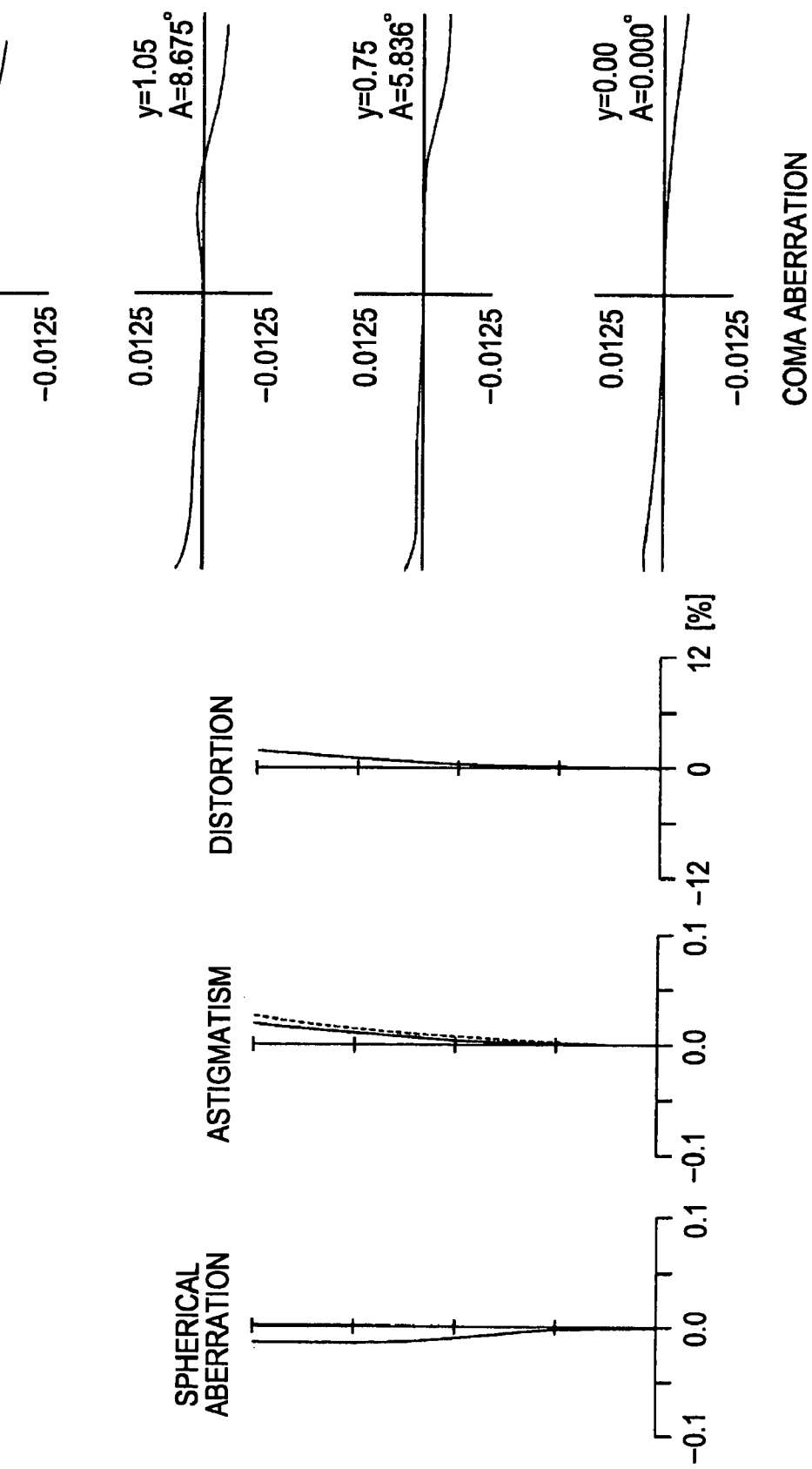
Figure 14:
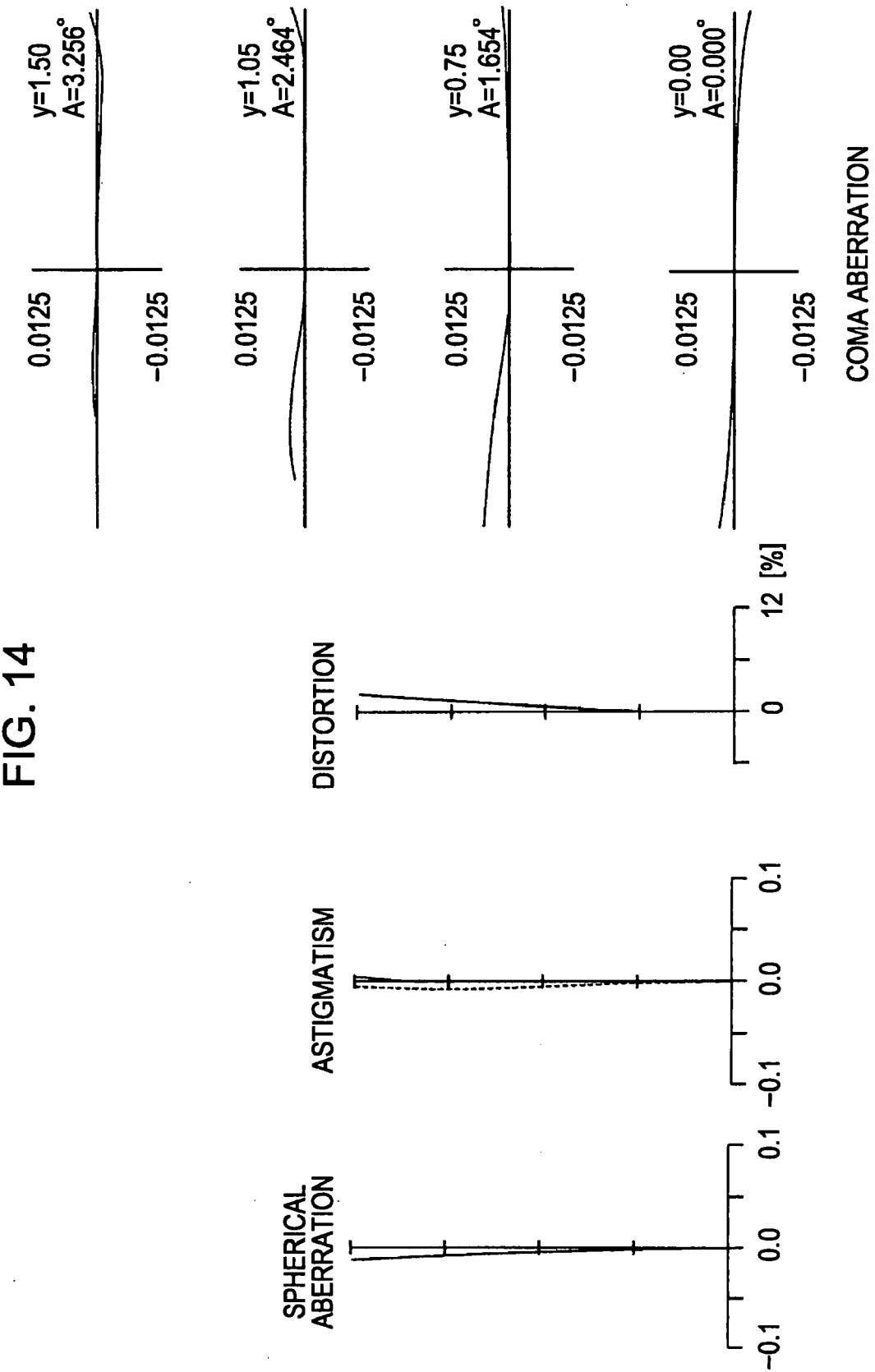

FIGS. 12 to 14 illustrate aberration graphs when the zoom lens focuses on infinity according to the second numerical example, where FIG. 12 illustrates aberration graphs in the wide-angle setting (f=2.812), FIG. 13 illustrates aberration graphs at the middle focal length setting (f=7.314), and FIG. 14 illustrates aberration graphs in the telephoto setting (f=25.845).

In the astigmatism graphs among the aberration graphs shown in FIGS. 12 to 14, a solid line indicates the sagittal image plane whereas a dotted line indicates the meridional image plane. In the coma aberration graphs, a symbol "y" indicates the image height, and a symbol "A" indicates the angle of field of view.

Figure 15:
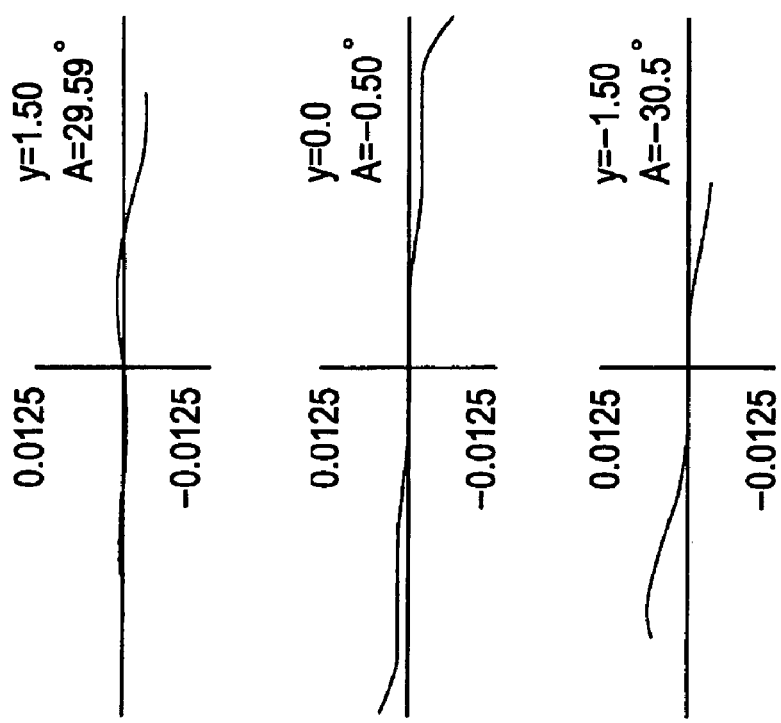
Figure 16:
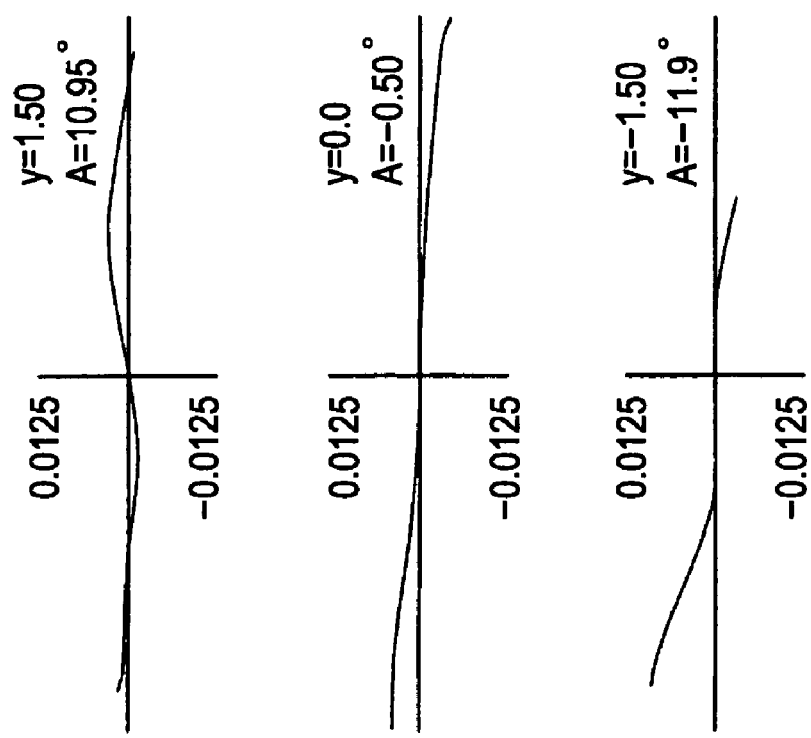
Figure 17:
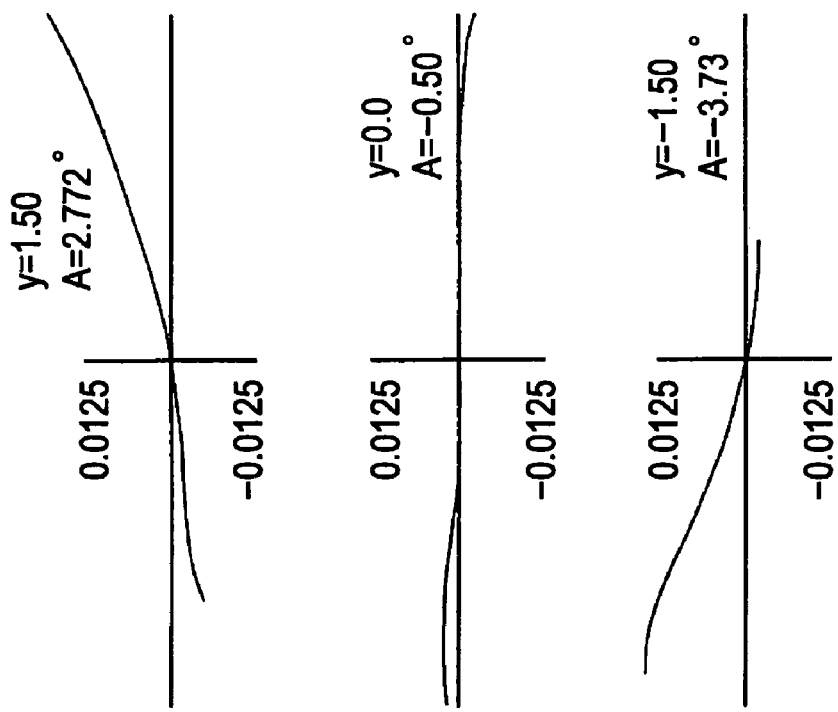

FIGS. 15 to 17 are transverse aberration graphs when the zoom lens focuses on infinity and is in a lens shift state corresponding to about 0.5 degrees according to the second numerical example, where FIG. 15 illustrates transverse aberration graphs in the wide-angle setting (f=2.812), FIG. 16 illustrates transverse aberration graphs in the middle focal length setting (f=7.314), and FIG. 17 illustrates transverse aberration graphs in the telephoto setting (f=25.845).

As can be seen from these aberration graphs, according to the second numerical example, various aberrations can be sufficiently corrected, and the zoom lens has an excellent image-forming performance.

Figure 18:
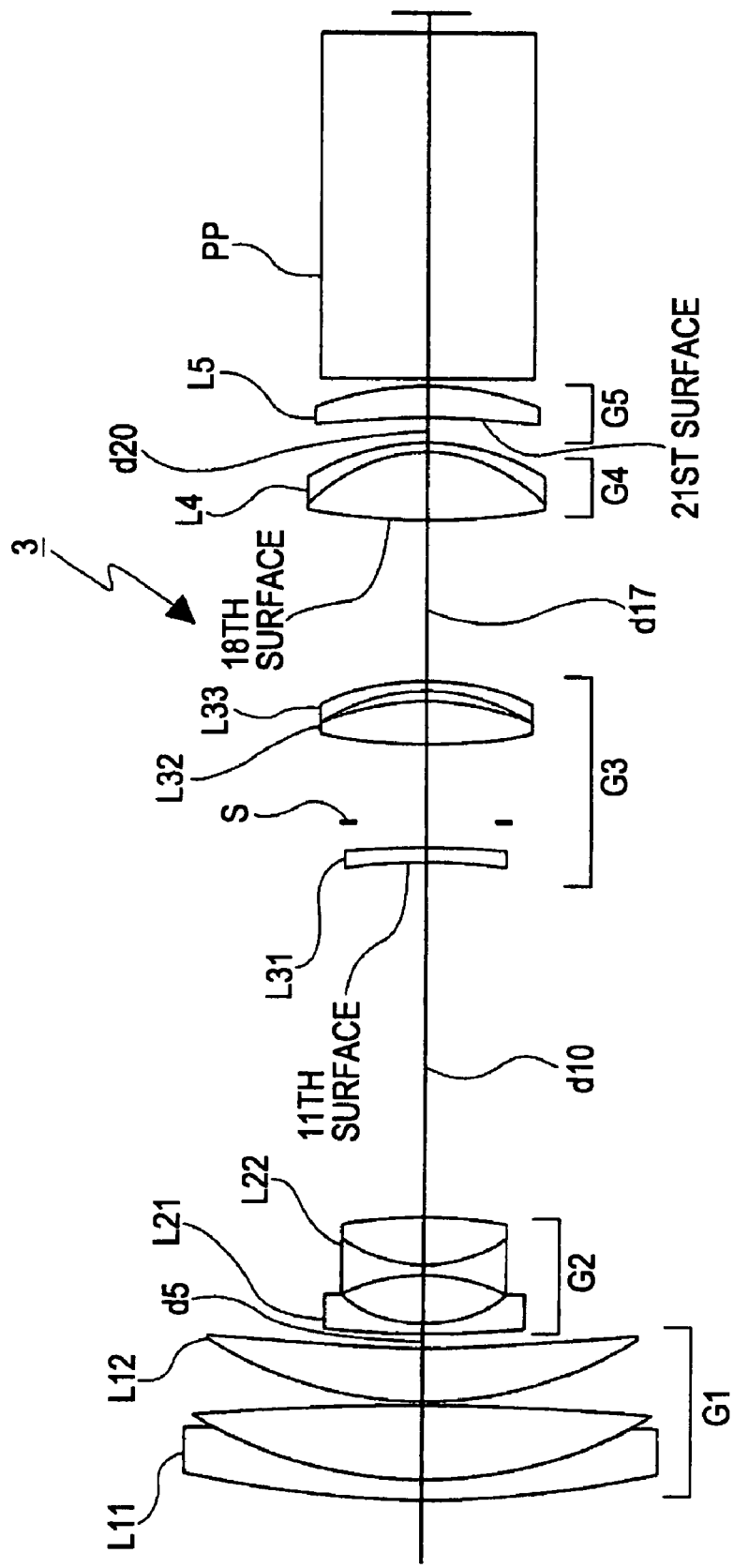
FIG. 18 illustrates a third example of a detailed lens structure of the zoom lens according to the third embodiment.

FIG. 18 illustrates a lens structure of the zoom lens 3 according to a third example. The first lens group G1 includes a cemented lens L11 composed of a negative meniscus lens having a convex surface on the object side and a positive lens having a convex surface on the object side and a positive lens L12 having a convex surface on the object side. The second lens group G2 includes a negative lens L21 having a concave surface on the image side and a cemented lens L22 composed of a negative biconcave lens and a positive lens having a convex surface on the object side. The third lens group G3 includes a negative meniscus lens L31 having a concave surface on the object side, a biconvex lens L32, and a negative meniscus lens L33. The fourth lens group G4 includes a positive cemented lens L4 composed of a biconvex lens and a negative meniscus lens. The fifth lens group G5 includes a positive lens L5 having a convex surface on the image side.

In the third example, in the third lens group G3 serving as a shift lens group, the negative meniscus lens L31 forms a negative subgroup whereas the biconvex lens L32 and the negative meniscus lens L33 having a convex surface on the object side form a positive subgroup. In addition, the aperture stop S is located between the negative subgroup L31 and the positive subgroup L32/L33 and remains stationary regardless of a change in a lens position setting. In addition, by shifting the positive subgroup L32/L33 in a direction perpendicular to the optical axis, an image can be shifted.

Furthermore, a color separation prism PP is disposed on the image side of the fifth lens group G5.

Table 9 is a specification sheet of a third numerical example in which specific values are applied to the third example.

TABLE 9 f 2.81~7.32~25.81
FN0 1.75~2.12~2.48
2ω 60.06~22.83~6.51°

| Surface number | Radius of curvature | Surface-surface distance | Index of refraction | Abbe number | |
|---|---|---|---|---|---|
| 1: | 51.3264 | 0.700 | 1.84666 | 23.8 | |
| 2: | 18.3094 | 3.170 | 1.62041 | 60.3 | |
| 3: | −99.5819 | 0.200 | | | |
| 4: | 16.7770 | 2.160 | 1.78800 | 47.5 | |
| 5: | 59.9262 | (D5) | | | |
| 6: | 59.9262 | 0.400 | 1.88300 | 40.8 | |
| 7: | 5.4769 | 2.030 | | | |
| 8: | −7.2873 | 0.400 | 1.83500 | 43.0 | |
| 9: | 6.0374 | 1.850 | 1.92286 | 20.9 | |
| 10: | −33.9310 | (D10) | | | |
| 11: | −41.7710 | 0.600 | 1.77250 | 49.6 | |
| 12: | −75.9697 | 1.000 | | | |
| 13: | 0.0000 | 3.100 | | | (Aperture Stop) |
| 14: | 19.6253 | 1.750 | 1.48749 | 70.4 | |
| 15: | −11.0961 | 0.400 | | | |
| 16: | −8.0862 | 0.400 | 1.88300 | 40.8 | |
| 17: | −10.1072 | (D17) | | | |
| 18: | 29.6855 | 2.670 | 1.48749 | 70.4 | |
| 19: | −6.6835 | 0.400 | 1.84666 | 23.8 | |
| 20: | −9.3625 | (D20) | | | |
| 21: | −50.0000 | 1.180 | 1.58913 | 61.3 | |
| 22: | −14.4628 | 0.400 | | | |
| 23: | 0.0000 | 13.880 | 1.58913 | 61.3 | (Prism) |
| 24: | 0.0000 | 0.805 | | | |

The 11th, 18th, 21st lens surfaces are aspherical. The aspherical coefficients of these lens surfaces are shown in Table 10.

TABLE 10

| 11th Surface | | |
|---|---|---|
| κ = +0.0000 | $C_4$ = −0.55451E−04 | $C_6$ = −0.12530E−04 |
| | $C_8$ = +0.12340E−05 | $C_{10}$ = −0.29518E−07 |
| 18th Surface | | |
| κ = +0.0000 | $C_4$ = −0.13168E−03 | $C_6$ = +0.24214E−05 |
| | $C_8$ = −0.81744E−07 | $C_{10}$ = +0.19889E−08 |
| 21th Surface | | |
| κ = +0.0000 | $C_4$ = −0.17948E−03 | $C_6$ = −0.50897E−06 |
| | $C_8$ = +0.48296E−07 | $C_{10}$ = −0.13619E−08 |

When the lens position setting is changed from the wide-angle setting to the telephoto setting, a surface-surface distance d5 between the first lens group G1 and the second lens group G2, a surface-surface distance d10 between the second lens group G2 and the third lens group G3, a surface-surface distance d17 between the third lens group G3 and the fourth lens group G4, and a surface-surface distance d20 between the fourth lens group G4 and the fifth lens group G5 are changed. Table 11 shows values of these surface-surface distances and focal lengths f in the wide-angle setting, the middle focal length setting which is between the wide-angle position and the telephoto position, and the telephoto setting.

TABLE 11

| f | 2.812 | 7.315 | 25.812 |
|---|---|---|---|
| D5 | 0.500 | 7.485 | 13.296 |
| D10 | 14.396 | 7.411 | 1.600 |
| D17 | 6.593 | 3.509 | 3.710 |
| D20 | 1.000 | 4.084 | 3.883 |
| Bf | 0.805 | 0.805 | 0.805 |

Table 12 shows values corresponding to the above-described conditional expressions (1), (2), (3), (4), and (5) according to the third numerical example.

TABLE 12 f3p = 21.034
f4 = 18.964
f5 = 34.120

(1) Ds/ft = 0.159
(2) D3p/f3p = 0.269
(3) D3s/R3p = 0.158
(4) f5/ft = 1.322
(5) f4/ft = 0.735

Figure 19:
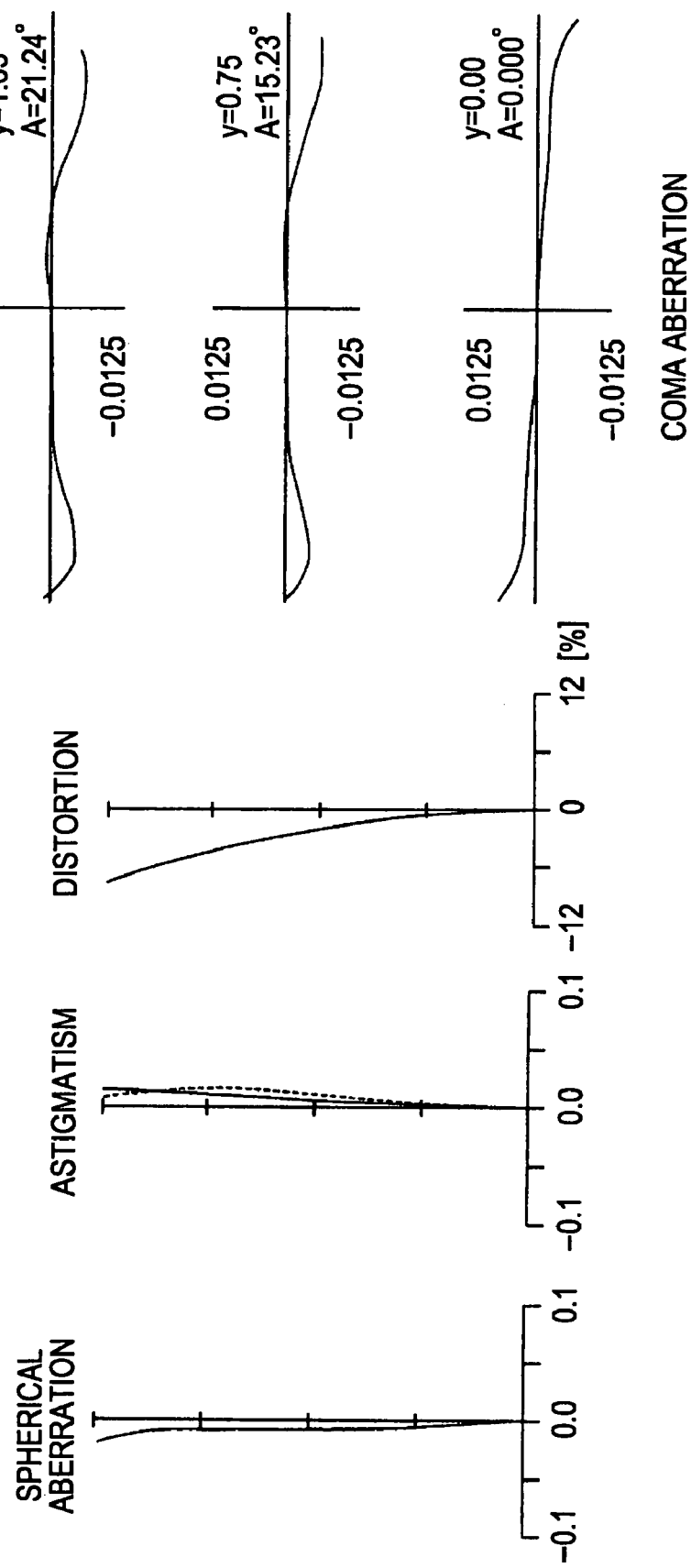
FIGS. 19 to 24 illustrate a variety of aberration graphs of a third numerical example in which specific values are applied to the third example, where
Figure 20:
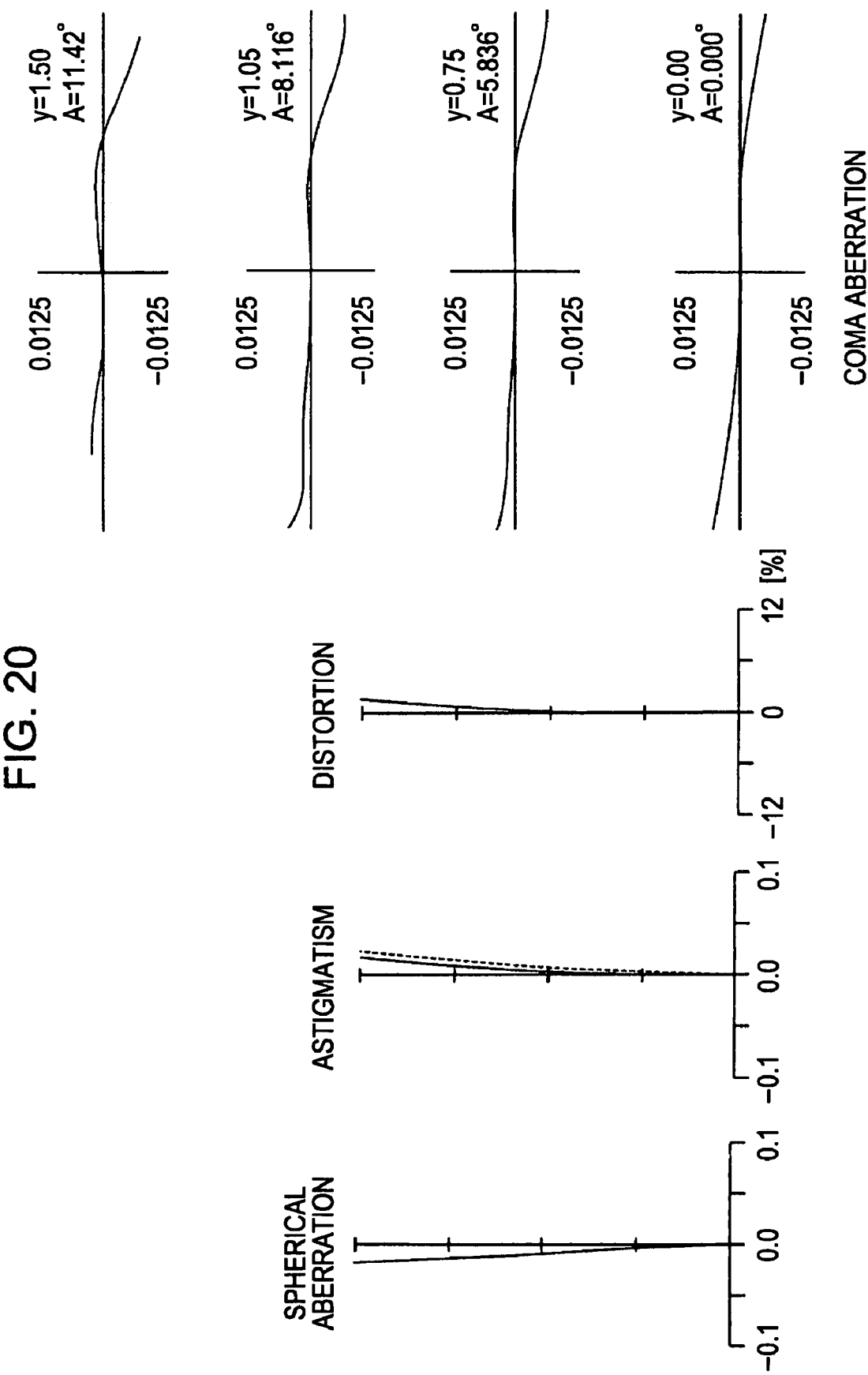
Figure 21:
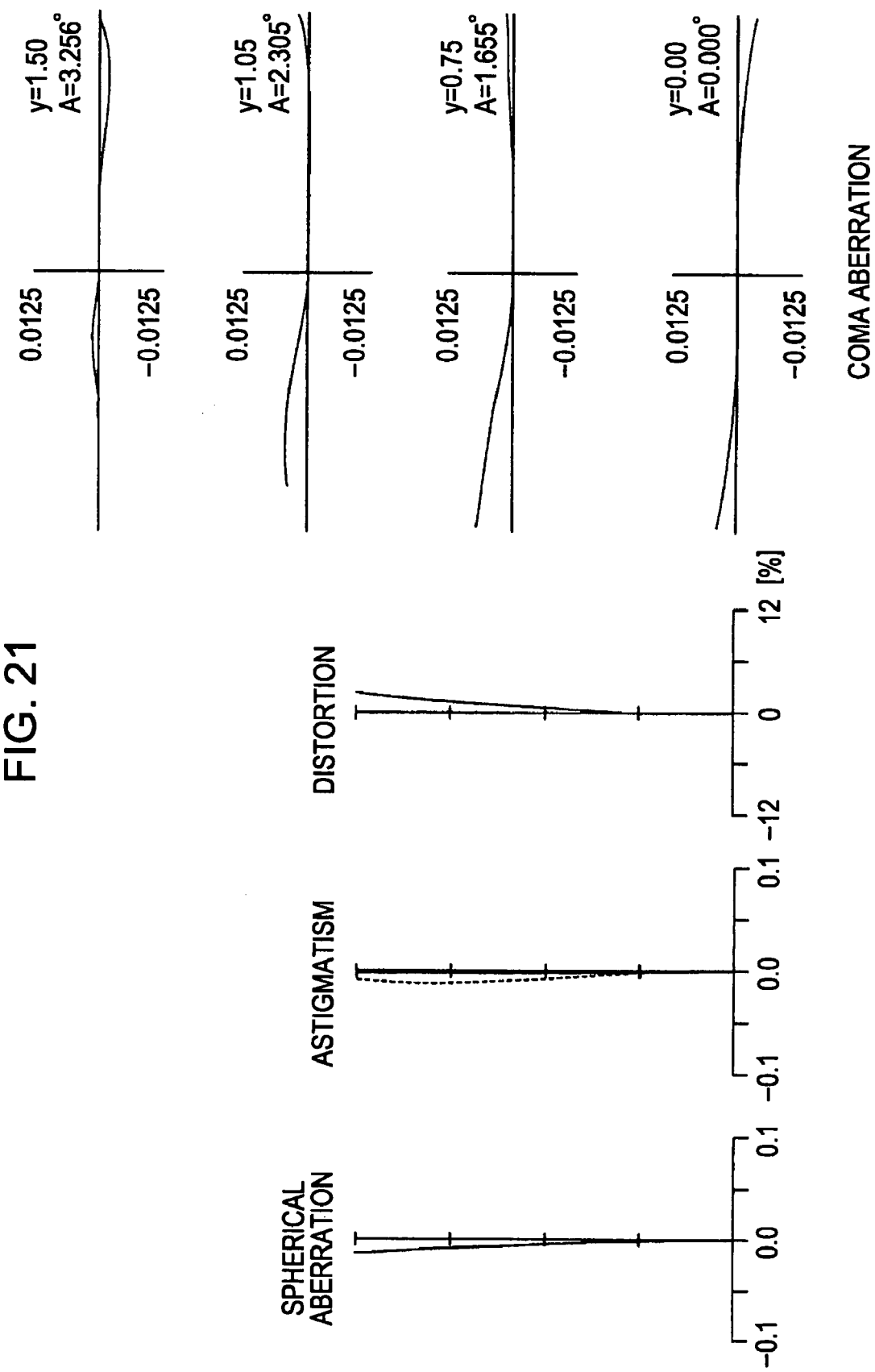

FIGS. 19 to 21 illustrate aberration graphs when the zoom lens focuses on infinity according to the third numerical example, where FIG. 19 illustrates aberration graphs in the wide-angle setting (f=2.812), FIG. 20 illustrates aberration graphs at the middle focal length setting (f=7.315), and FIG. 21 illustrates aberration graphs in the telephoto setting (f=25.812).

In the astigmatism graphs among the aberration graphs shown in FIGS. 19 to 21, a solid line indicates the sagittal image plane whereas a dotted line indicates the meridional image plane. In the coma aberration graphs, a symbol "y" indicates the image height, and a symbol "A" indicates the angle of field of view.

Figure 22:
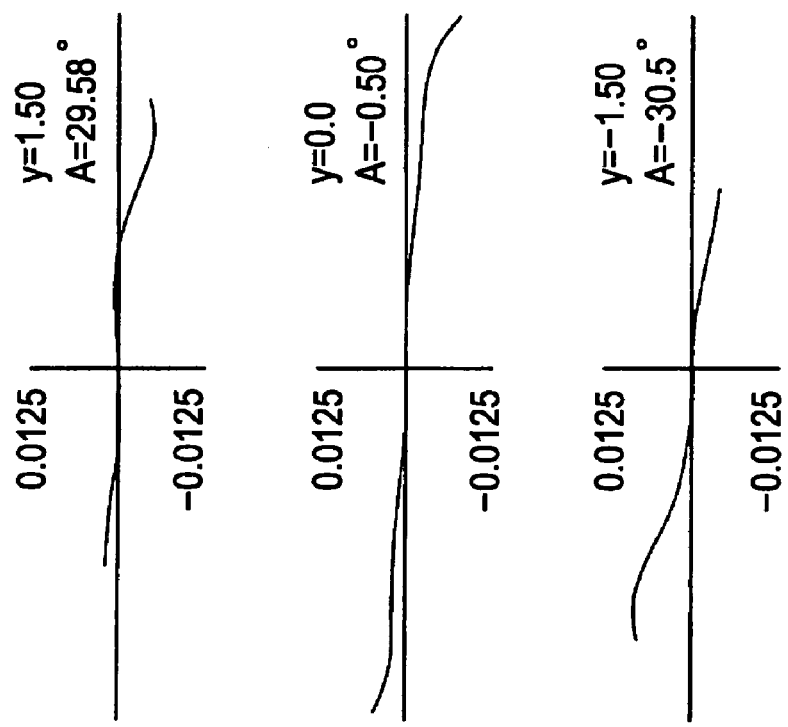
Figure 23:
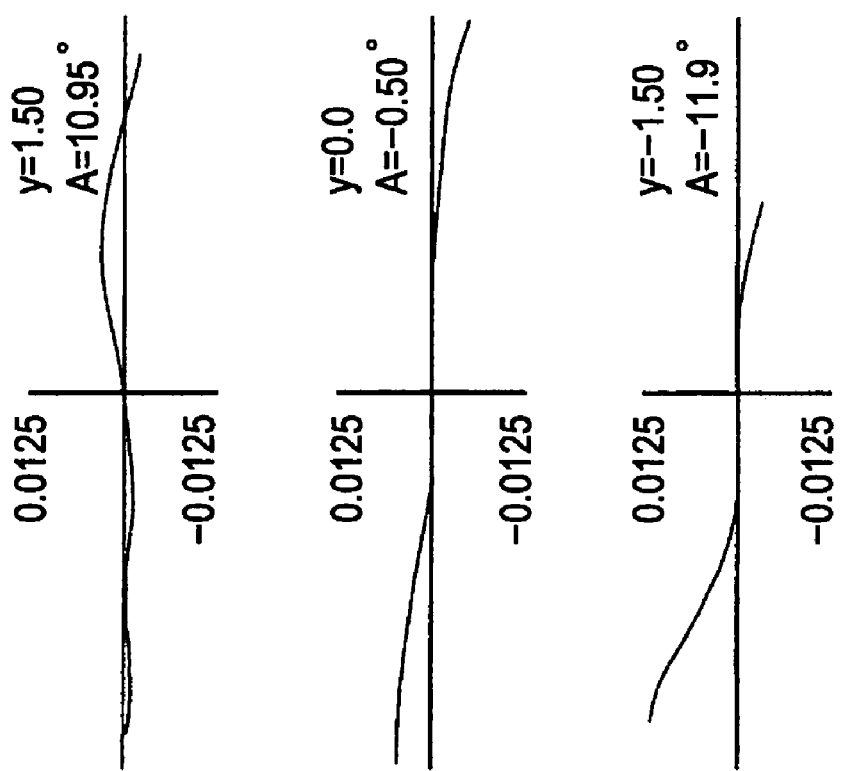
Figure 24:
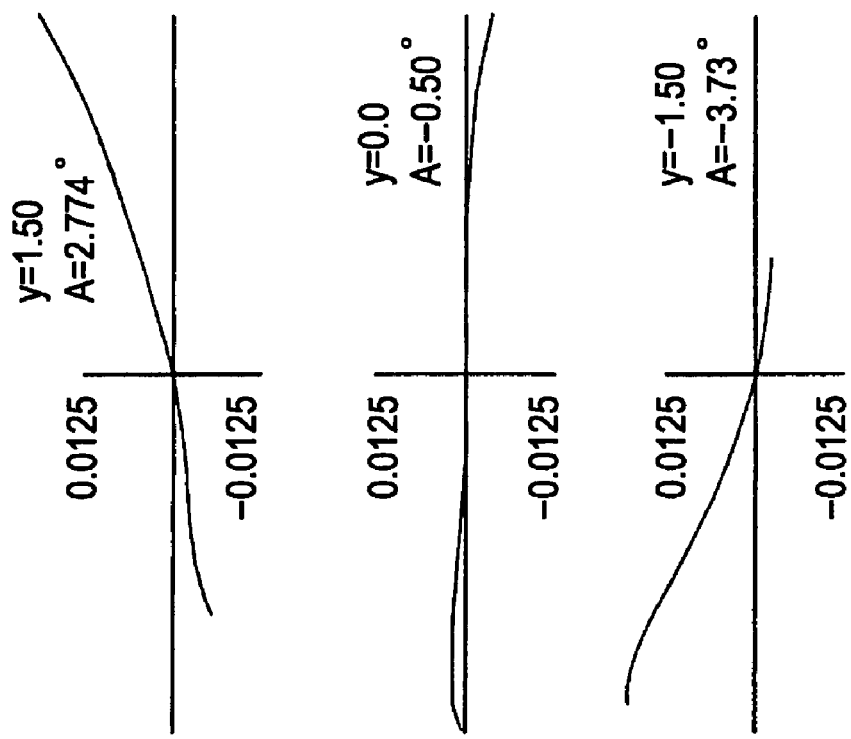

FIGS. 22 to 24 are transverse aberration graphs when the zoom lens focuses on infinity and is in a lens shift state corresponding to about 0.5 degrees according to the third numerical example, where FIG. 22 illustrates transverse aberration graphs in the wide-angle setting (f=2.812), FIG. 23 illustrates transverse aberration graphs in the middle focal length setting (f=7.315), and FIG. 24 illustrates transverse aberration graphs in the telephoto setting (f=25.812).

As can be seen from these aberration graphs, according to the third numerical example, various aberrations can be sufficiently corrected, and the zoom lens has an excellent image-forming performance.

Figure 25:
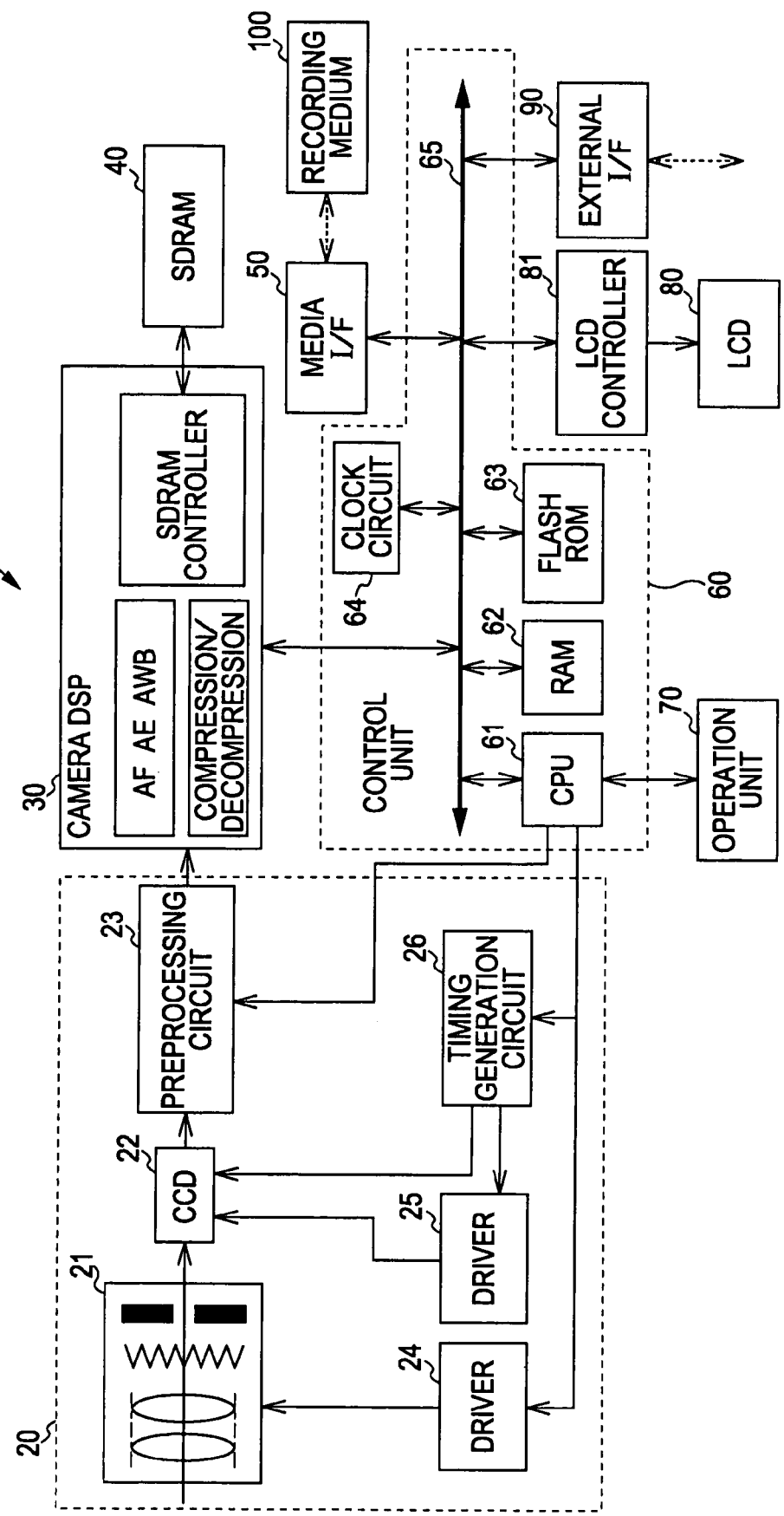
FIG. 25 is a block diagram of an image capturing apparatus according to an embodiment of the present invention.

FIG. 25 illustrates an image capturing apparatus according to an embodiment of the present invention.

According to the present embodiment, as shown in FIG. 25, an image capturing apparatus 10 primarily includes a camera unit 20, a camera digital signal processor (DSP) 30, a synchronous dynamic random access memory (SDRAM) 40, a media interface (hereinafter referred to as a "media I/F") 50, a control unit 60, an operation unit 70, a liquid crystal display (LCD) 80, and an external interface (hereinafter referred to as an "external I/F") 90. The image capturing apparatus 10 further includes a removable recording medium 100.

Examples of the recording medium 100 include a so-called memory card using a semiconductor memory, an optical recording medium, such as a recordable digital versatile disk (DVD) or a recordable compact disc (CD), and a magnetic disk. In the present embodiment, the recording medium 100 is, for example, a memory card.

The camera unit 20 includes an optical block 21, a charged coupled device (CCD) 22, a preprocessing circuit 23, an optical block driver 24, a CCD driver 25, and a timing generation circuit 26. Here, the optical block 21 includes a lens, a focusing mechanism, a shutter mechanism, and an aperture (iris) mechanism. The above-described zoom lens according to the present invention, such as the zoom lens 1, 2, or 3, is used for the lens in the optical block 21. In addition, to receive R, G, and B separated images and combine the R, G, and B images to generate information about a color image, a color separation prism is disposed between the image plane and a lens group closest to the image plane. Furthermore, the CCD 22 is provided for each of the R, G, and B colors separated by the color separation prism. In such a case, a lowpass filter LPF may be disposed immediately in front of each CCD (on the object side) or may be disposed on the object side of the color separation prism.

Additionally, the control unit 60 is a microcomputer including a central processing unit (CPU) 61, a random access memory (RAM) 62, a flash read only memory (ROM) 63, and a clock circuit 64 connected to each other via a system bus 65. The control unit 60 can control each of components of the image capturing apparatus 10 according to the present embodiment.

Here, the RAM 62 is mainly used as a working area for, for example, temporarily storing an intermediate result of a process. The flash ROM 63 stores a variety of programs executed by the CPU 61 and data required for the processing. The clock circuit 64 can provide the current year, month and day, the day of a week, and the current time. The clock circuit 64 can further provide a recording date and time.

While an image is being recorded, the optical block driver 24 generates a drive signal for operating the optical block 21 under the control of the control unit 60. Thereafter, the optical block driver 24 delivers this drive signal to the optical block 21 so as to operate the optical block 21. The optical block 21 controls the focusing mechanism, the shutter mechanism, and the aperture mechanism in response to the drive signal received from the optical block driver 24 so as to receive an image of the object. Subsequently, the optical block 21 delivers the received image to the CCD 22.

The CCD 22 photoelectrically converts and outputs the image received from the optical block 21. The CCD 22 operates in response to the drive signal received from the CCD driver 25 so as to retrieve the image of the object from the optical block 21. In addition, the CCD 22 delivers the retrieved image (image information) of the object to the preprocessing circuit 23 in the form of an electrical signal in response to a timing signal output from the timing generation circuit 26, which is controlled by the control unit 60.

As noted above, the timing generation circuit 26 generates a timing signal that is used for providing a predetermined timing under the control of the control unit 60. In addition, the CCD driver 25 generates a drive signal which is delivered to the CCD 22 in response to the timing signal delivered from the timing generation circuit 26.

The preprocessing circuit 23 performs a correlated double sampling (CDS) process on the received image information in the form of an electrical signal so as to maintain a sufficient S/N ratio. The preprocessing circuit 23 further performs an automatic gain control (AGC) process to control the gain and performs an analog/digital (A/D) conversion so as to generate image data in the form of a digital signal.

The image data in the form of a digital signal output from the preprocessing circuit 23 is delivered to the camera DSP 30. The camera DSP 30 performs camera signal processes, such as an auto focus (AF) process, an auto exposure (AE) process, and an auto white balance (AWB) process, on the delivered image data. The image data subjected to these processes is data-compressed using a predetermined compression technique and is delivered to the recording medium 100 mounted in the image capturing apparatus 10 according to the present embodiment via the system bus 65 and the media I/F 50. As described below, the image data is recorded on the recording medium 100 in the form of a file.

In addition, desired image data is read out from among the image data recorded on the recording medium 100 via the media I/F 50 in response to a user operation received via the operation unit 70 including a touch panel or a control key. The readout image data is delivered to the camera DSP 30.

The camera DSP 30 performs a decompress process (an expansion process) on the compressed image data that is read out from the recording medium 100 and that is delivered via the media I/F 50. Thereafter, the camera DSP 30 delivers the decompressed image data to an LCD controller 81. The LCD controller 81 generates an image signal to be delivered to the LCD 80 from the delivered image data. In this way, an image corresponding to the image data recorded on the recording medium 100 is displayed on a display screen of the LCD 80.

A display processing program recorded in the ROM determines how to display the image. That is, this display processing program determines the recording scheme of a file system, which is described below, and the scheme for playing back the image.

In addition, the image capturing apparatus 10 according to the present embodiment includes the external I/F 90. When the image capturing apparatus 10 is connected to, for example, an external personal computer via the external I/F 90, the image capturing apparatus 10 can receive image data from the personal computer and store the received image data on the recording medium 100 mounted in the image capturing apparatus 10. Additionally, the image capturing apparatus 10 can supply image data recorded on the recording medium 100 mounted in the image capturing apparatus 10 to the external personal computer.

Furthermore, when a communication module is connected to the external I/F 90, the image capturing apparatus 10 can be connected to a network (e.g., the Internet). Thus, the image capturing apparatus 10 can acquire a variety of image data or other information via the network so as to record the image data or the information on the recording medium 100 mounted in the image capturing apparatus 10. In addition, the image capturing apparatus 10 can transmit data recorded on the recording medium 100 mounted in the image capturing apparatus 10 to a desired target end of communication via the network.

Still furthermore, as noted above, the image capturing apparatus according to the present embodiment can read out information, such as image data acquired via an external personal computer or the network and recorded in the recording medium, so as to play back and display the information on the LCD 80. Thus, the user can utilize the information.

The external I/F 90 may be a wired interface, such as an IEEE (Institute of Electrical and Electronics Engineers) 1394 interface or a USB (Universal Serial Bus) interface. Alternatively, the external I/F 90 may be a wireless interface using light or radio waves. That is, the external I/F 90 may be a wired interface or a wireless interface.

As noted above, the image capturing apparatus 10 according to the present embodiment can capture an image of a subject and record the captured image on the recording medium 100 mounted in the image capturing apparatus 10. In addition, the image capturing apparatus 10 can read out image data recorded on the recording medium 100 to play back and use the image data. Furthermore, the image capturing apparatus 10 can receive image data from an external personal computer or a network and record the received image data on the recording medium 100 mounted in the image capturing apparatus 10. Still furthermore, the image capturing apparatus 10 can read out the recorded image data to play back the recorded image data.

While, in the foregoing description, image sensing means of the image capturing apparatus 10 according to the present invention has been described with reference to a CCD, the image sensing means is not limited to a CCD. For example, in place of a CCD, a CMOS (Complementary Metal-Oxide Semiconductor) or other image sensing devices can be used.

The particular shapes, structures, and values in the above-described embodiments and numerical examples are only examples for realizing the present invention and it should not be construed that the technical scope of the invention is limited thereto.

INDUSTRIAL APPLICABILITY

The zoom lens and the image capturing apparatus including the zoom lens can be provided. The present invention can be widely applied to digital video cameras and digital still cameras.

According to the present invention, a zoom lens includes at least three lens groups, that is, a negative lens group having a negative refractive power, a shift lens group, and a positive lens group having a positive refractive power arranged in this order from an object side. When the lens position is moved from a wide-angle setting to a telephoto setting, at least the negative lens group and the positive lens group move so that a distance between the negative lens group and the shift lens group is decreased and a distance between the shift lens group and the positive lens group is changed. The shift lens group includes at least two subgroups, an aperture stop is disposed between the two subgroups, and an image is capable of being shifted by shifting one of the subgroups in a direction substantially perpendicular to an optical axis. The following conditional expression (1) is satisfied:

$$Ds/ft > 0.1 \tag{1}$$

where Ds denotes a distance along the optical axis extending from the lens surface that is the closest to the image among the lens surfaces of the subgroup located on the object side to the lens surface that is the closest to the object among the lens surfaces of the subgroup located on the image side, and ft denotes the focal length of the entire lens system in the telephoto setting.

In addition, according to the present invention, an image capturing apparatus includes a zoom lens and an image sensing device for converting an optical image formed by the zoom lens to an electrical signal. The zoom lens includes at least three lens groups, that is, a negative lens group having a negative refractive power, a shift lens group, and a positive lens group having a positive refractive power arranged in this order from an object side. When the lens position is moved from a wide-angle setting to a telephoto setting, at least the negative lens group and the positive lens group move so that a distance between the negative lens group and the shift lens group is decreased and a distance between the shift lens group and the positive lens group is changed. The shift lens group includes at least two subgroups, an aperture stop is disposed between the two subgroups, and an image is capable of being shifted by shifting one of the subgroups in a direction substantially perpendicular to an optical axis. The following conditional expression (1) is satisfied:

$$Ds/ft > 0.1 \tag{1}$$

where Ds denotes a distance along the optical axis extending from the lens surface that is the closest to the image among the lens surfaces of the subgroup located on the object side to the lens surface that is the closest to the object among the lens surfaces of the subgroup located on the image side, and ft denotes the focal length of the entire lens system in the telephoto setting.

Accordingly, in the present invention, the distance between the two subgroups of the shift lens group can be sufficiently increased without increasing the size of the entire lens system. That is, the aperture stop is disposed between the two subgroups, and the distance between the two subgroups includes a space that is originally required for disposing the aperture stop. Therefore, even when the distance between the two subgroups is sufficiently increased, the length of the zoom lens need not be increased in order to increase the distance between the two subgroups. As a result, the distance between the two subgroups of the shift lens group can be sufficiently increased so that the refractive powers of the two subgroups can be decreased. Therefore, the sensitivity of an axis tilt between the two subgroups is reduced, and therefore, sufficient performance can be maintained. In addition, a change in the angle of field of view occurring when either one of the subgroups is shifted can be reduced.

In summary, the zoom lens and the image capturing apparatus can prevent degradation of the image quality when the image is shifted while maintaining the compactness of the body.

According to the invention described in claims 2 and 11, the zoom lens includes a first lens group having a positive refractive power and disposed on the object side of the negative lens group and a fifth lens group having a positive refractive power and disposed on the image side of the positive lens group so that the zoom lens has a five-group structure. When the lens position is moved from a wide-angle setting to a telephoto setting, the first lens group remains stationary along the optical axis, the negative lens group serving as a second lens group is moved towards the image side, the shift lens group serving as a third lens group remains stationary along the optical axis, the positive lens group serving as a fourth lens group compensates for a variation in the position of an image plane caused by the movement of the second lens group and moves along the optical axis when a short-distance focusing is performed, and the fifth lens group remains stationary along the optical axis. The third lens group includes a negative subgroup having a negative refractive power and disposed on the object side and a positive subgroup having a positive refractive power and disposed on the image side, an aperture stop is disposed between the negative subgroup and the positive subgroup, and an image is capable of being shifted by shifting the positive subgroup in the direction substantially perpendicular to an optical axis. Accordingly, a zoom lens having a high magnification ratio of about 10, an image stabilization function, and small degradation of an image at the time of shifting can be achieved. In addition, an image capturing apparatus including the zoom lens can be achieved.

According to the invention described in claims 3, 4, 12, and 13, the zoom lens satisfies the following conditional expression (2):

$$D3P/f3P < 0.35 \tag{2}$$

where D3P denotes a distance between the aperture stop and the lens surface that is the closest to the image among the lens surfaces of the subgroup located on the image side, and f3P denotes the focal length of the subgroup located on the image side. Accordingly, the zoom lens can sufficiently correct variation in coma aberration occurring at the peripheral portion of a screen when the subgroup on the image side is shifted.

According to the invention described in claims 5, 6, 14, and 15, the zoom lens satisfies the following conditional expression (3):

$$0.08 < D3s/R3p < 0.2 \qquad (3)$$

where D3s denotes a distance along the optical axis extending from the aperture stop to the lens surface that is the closest to the object among the lens surfaces of the subgroup located on the image side, and R3p denotes the radius of curvature of the lens surface that is the closest to the object among the lens surfaces of the subgroup located on the image side. Accordingly, the zoom lens can sufficiently correct variation in coma aberration occurring when the subgroup on the image side is shifted.

According to the invention described in claims 7, 16, and 17, the positive subgroup includes a positive biconvex lens and a negative meniscus lens having a concave surface on the object side. Accordingly, spherical aberration can be sufficiently corrected. In addition, since the lens surface of the positive subgroup closest to the image is concave with respect to the aperture stop, the zoom lens can sufficiently correct variation in coma aberration occurring when the positive subgroup is shifted.

According to the invention described in claims 8 and 18, the zoom lens satisfies the following conditional expression (4):

$$1 < f5/ft < 1.7 \qquad (4)$$

where f5 denotes the focal length of the fifth lens group. Accordingly, the zoom lens can realize the compactness and high performance at the same time and realize further compactness and high performance.

According to the invention described in claims 9 and 19, when f4 denotes the focal length of the fourth lens group, conditional expression (5) 0.6<f4/ft<0.9 is satisfied. Accordingly, the total length of the lens can be further reduced and the performance can be further improved.

The invention claimed is:

1. A zoom lens comprising:
   at least three lens groups including a negative lens group having a negative refractive power, a shift lens group, and a positive lens group having a positive refractive power arranged in this order from an object side, at least the negative lens group and the positive lens group moving so that, when the lens position is moved from a wide-angle setting to a telephoto setting, a distance between the negative lens group and the shift lens group is decreased and a distance between the shift lens group and the positive lens group is changed;
   wherein the shift lens group comprises at least two subgroups, an aperture stop is disposed between the two subgroups, and an image is capable of being shifted by shifting one of the subgroups in a direction substantially perpendicular to an optical axis, and wherein the following conditional expression (1) is satisfied:

$$Ds/ft > 0.1 \qquad (1)$$

where
   Ds denotes a distance along the optical axis extending from the lens surface that is the closest to the image among the lens surfaces of the subgroup located on the object side to the lens surface that is the closest to the object among the lens surfaces of the subgroup located on the image side, and
   ft denotes the focal length of the entire lens system in the telephoto setting, and
   wherein the following conditional expression (2) is satisfied:

$$0.08 < D3s/R3p < 0.2 \qquad (2)$$

where
   D3s denotes a distance along the optical axis extending from the aperture stop to the lens surface that is the closest to the object among the lens surfaces of the subgroup located on the image side, and
   R3p denotes the radius of curvature of the lens surface that is the closest to the object among the lens surfaces of the subgroup located on the image side.

2. The zoom lens according to claim 1, wherein the following conditional expression (3) is satisfied:

$$D3P/f3P < 0.35 \qquad (3)$$

where
   D3P denotes a distance between the aperture stop and the lens surface that is the closest to the image among the lens surfaces of the subgroup located on the image side, and
   f3P denotes the focal length of the subgroup located on the image side.

3. The zoom lens according to claim 1, further comprising:
   a first lens group having a positive refractive power and disposed on the object side of the negative lens group; and
   a fifth lens group having a positive refractive power and disposed on the image side of the positive lens group so that the zoom lens has a five-group structure;
   wherein, when the lens position is moved from a wide-angle setting to a telephoto setting, the first lens group remains stationary along the optical axis, the negative lens group serving as a second lens group is moved towards the image side, the shift lens group serving as a third lens group remains stationary along the optical axis, the positive lens group serving as a fourth lens group compensates for a variation in the position of an image plane caused by the movement of the second lens group and moves along the optical axis when a short-distance focusing is performed, and the fifth lens group remains stationary along the optical axis, and wherein the third lens group comprises a negative subgroup having a negative refractive power and disposed on the object side of an aperture stop and a positive subgroup having a positive refractive power and disposed on the image side of the aperture stop, and wherein the aperture stop is disposed between the negative subgroup and the positive subgroup, and an image is capable of being shifted by shifting the positive subgroup in the direction substantially perpendicular to an optical axis.

4. The zoom lens according to claim 3, wherein the following conditional expression (3) is satisfied:

$$D3P/f3P < 0.35 \qquad (3)$$

where
- D3P denotes a distance between the aperture stop and the lens surface that is the closest to the image among the lens surfaces of the subgroup located on the image side, and
- f3P denotes the focal length of the subgroup located on the image side.

5. The zoom lens according to claim 3, wherein the positive subgroup comprises a positive biconvex lens and a negative meniscus lens having a concave surface on the object side.

6. The zoom lens according to claim 3, wherein the following conditional expression (4) is satisfied:

$$1 < f5/ft < 1.7 \tag{4}$$

where f5 denotes the focal length of the fifth lens group.

7. The zoom lens according to claim 3, wherein the following conditional expression (5) is satisfied:

$$0.6 < f4/ft < 0.9 \tag{5}$$

where f4 denotes the focal length of the fourth lens group.

8. An image capturing apparatus comprising:
a zoom lens including at least three lens groups including a negative lens group having a negative refractive power, a shift lens group, and a positive lens group having a positive refractive power arranged in this order from an object side, at least the negative lens group and the positive lens group moving so that, when the lens position is moved from a wide-angle setting to a telephoto setting, a distance between the negative lens group and the shift lens group is decreased and a distance between the shift lens group and the positive lens group is changed; and
an image sensing device for converting an optical image formed by the zoom lens to an electrical signal;
wherein the shift lens group comprises at least two subgroups, an aperture stop is disposed between the two subgroups, and an image is capable of being shifted by shifting one of the subgroups in a direction substantially perpendicular to an optical axis, and wherein the following conditional expression (1) is satisfied:

$$Ds/ft > 0.1 \tag{1}$$

where
- Ds denotes a distance along the optical axis extending from the lens surface that is the closest to the image among the lens surfaces of the subgroup located on the object side to the lens surface that is the closest to the object among the lens surfaces of the subgroup located on the image side, and
- ft denotes the focal length of the entire lens system in the telephoto setting, and wherein the following conditional expression (2) is satisfied:

$$0.08 < D3s/R3p < 0.2 \tag{2}$$

where
- D3s denotes a distance along the optical axis extending from the aperture stop to the lens surface that is the closest to the object among the lens surfaces of the subgroup located on the image side, and
- R3p denotes the radius of curvature of the lens surface that is the closest to the object among the lens surfaces of the subgroup located on the image side.

9. The image capturing apparatus according to claim 8, wherein the following conditional expression (3) is satisfied:

$$D3P/f3P < 0.35 \tag{3}$$

where
- D3P denotes a distance between the aperture stop and the lens surface that is the closest to the image among the lens surfaces of the subgroup located on the image side, and
- f3P denotes the focal length of the subgroup located on the image side.

10. The image capturing apparatus according to claim 8, wherein the zoom lens further comprises a first lens group having a positive refractive power and disposed on the object side of the negative lens group and a fifth lens group having a positive refractive power and disposed on the image side of the positive lens group so that the zoom lens has a five-group structure, and wherein, when the lens position is moved from a wide-angle setting to a telephoto setting, the first lens group remains stationary along the optical axis, the negative lens group serving as a second lens group is moved towards the image side, the shift lens group serving as a third lens group remains stationary along the optical axis, the positive lens group serving as a fourth lens group compensates for a variation in the position of an image plane caused by the movement of the second lens group and moves along the optical axis when a short-distance focusing is performed, and the fifth lens group remains stationary along the optical axis, and wherein the third lens group comprises a negative subgroup having a negative refractive power and disposed on the object side of an aperture stop and a positive subgroup having a positive refractive power and disposed on the image side of the aperture stop, and wherein the aperture stop is disposed between the negative subgroup and the positive subgroup, and an image is capable of being shifted by shifting the positive subgroup in the direction substantially perpendicular to an optical axis.

11. The image capturing apparatus according to claim 10, wherein the positive subgroup comprises a positive biconvex lens and a negative meniscus lens having a concave surface on the object side.

12. The image capturing apparatus according to claim 10, wherein the following conditional expression (4) is satisfied:

$$1 < f5/ft < 1.7 \tag{4}$$

where f5 denotes the focal length of the fifth lens group.

13. The image capturing apparatus according to claim 10, wherein the following conditional expression (5) is satisfied:

$$0.6 < f4/ft < 0.9 \tag{5}$$

where f4 denotes the focal length of the fourth lens group.

14. The zoom lens according to claim 10, wherein the following conditional expression (3) is satisfied:

$$D3P/f3P < 0.35 \tag{3}$$

where
- D3P denotes a distance between the aperture stop and the lens surface that is the closest to the image among the lens surfaces of the subgroup located on the image side, and
- f3P denotes the focal length of the subgroup located on the image side.

15. The image capturing apparatus according to claim 14, wherein the positive subgroup comprises a positive biconvex lens and a negative meniscus lens having a concave surface on the object side.

* * * * *